(12) United States Patent
Herley et al.

(10) Patent No.: US 7,539,478 B2
(45) Date of Patent: *May 26, 2009

(54) SELECT CONTENT AUDIO PLAYBACK SYSTEM FOR AUTOMOBILES

(75) Inventors: Cormac Herley, Bellevue, WA (US); Jonathan C. Platt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 550 days.

This patent is subject to a terminal disclaimer.

(21) Appl. No.: 11/188,936

(22) Filed: Jul. 25, 2005

(65) Prior Publication Data

US 2005/0262528 A1  Nov. 24, 2005

Related U.S. Application Data

(63) Continuation of application No. 10/180,249, filed on Jun. 26, 2002, now Pat. No. 6,996,390.

(51) Int. Cl.
*H04B 1/06* (2006.01)

(52) U.S. Cl. ............... 455/345; 455/158.4; 455/170.1; 455/230; 725/44

(58) Field of Classification Search ... 455/150.1–168.1, 455/170.1, 179.1, 200.1, 227, 230, 313, 334, 455/345; 709/203; 725/38–45, 46, 47, 48
See application file for complete search history.

(56) References Cited

U.S. PATENT DOCUMENTS

| | | | |
|---|---|---|---|
| 5,616,876 A | 4/1997 | Cluts | |
| 6,185,527 B1 | 2/2001 | Petkovic et al. | |
| 6,345,256 B1 | 2/2002 | Milsted et al. | |
| 6,434,520 B1 | 8/2002 | Kanevsky et al. | |
| 6,529,584 B1 * | 3/2003 | Ravago et al. | 379/67.1 |
| 6,545,209 B1 | 4/2003 | Flannery et al. | |
| 6,636,773 B1 | 10/2003 | Tagawa et al. | |
| 6,779,196 B1 | 8/2004 | Igbinadolor | |
| 6,965,770 B2 * | 11/2005 | Walsh et al. | 455/426.1 |
| 7,171,174 B2 * | 1/2007 | Ellis et al. | 455/132 |
| 2002/0120925 A1 * | 8/2002 | Logan | 725/9 |
| 2002/0170068 A1 * | 11/2002 | Rafey et al. | 725/112 |
| 2003/0093790 A1 * | 5/2003 | Logan et al. | 725/38 |
| 2003/0101230 A1 * | 5/2003 | Benschoter et al. | 709/217 |

(Continued)

OTHER PUBLICATIONS

David B. Hauver, et al., Flycasting: Using Collaborative Filtering to Generate a Playlist for Online Radio, 2001, 5 pages.

(Continued)

*Primary Examiner*—Blane J Jackson
(74) *Attorney, Agent, or Firm*—Amin, Turocy & Calvin, LLP

(57) ABSTRACT

The present invention provides a large capacity, user defined audio content delivery system. The system delivers uninterrupted music and delivers information content (e.g., news by evaluating and encoding an input audio stream while outputting another stream. Undesirable audio content (e.g., advertisements and unwanted news) are not present in the output audio stream as only desired portions of information content are stored for playback on demand. The invention also includes a user interface that is simple enough to facilitate utilization of the audio system in an automobile and employs standard hardware available in typical computing and/or personal digital assistant equipment. Additionally, the audio system can be portable (e.g., as portable as a personal digital assistant) and can be updated in real time or off line via a personal computer.

20 Claims, 21 Drawing Sheets

U.S. PATENT DOCUMENTS

| | | | |
|---|---|---|---|
| 2003/0177247 A1* | 9/2003 | Dunning et al. | 709/228 |
| 2005/0028194 A1* | 2/2005 | Elenbaas et al. | 725/32 |
| 2005/0049002 A1 | 3/2005 | White et al. | |
| 2005/0091685 A1* | 4/2005 | Sezan et al. | 725/46 |
| 2005/0198677 A1* | 9/2005 | Lewis | 725/87 |
| 2008/0052739 A1* | 2/2008 | Logan | 725/25 |

OTHER PUBLICATIONS

Masoud Alghoniemy et al., A Network Flow Model for Playlist Generation, 2001, 4 pages.

Adam Field et al., Personal DJ, and Architecture for Personalised Content Delivery, 2001, 8 pages.

1998 Press Releases "Realnetworks Introduces Mobile Daily Briefing, The First Internent Site Dedicated to Bringing Internet Audio to Portable Devices", http://www.realnetworks.com/company/press/releases/1998/mobiledb.html, May 26, 2003.

CD Media World, Downloding Streaming Media ont Rio MP3 Using Media Manager . . . http://cdmedialworld.com/hardware/cdrom/news/0001/voquett mp3.shtml, 2 pages, May 26, 2003.

* cited by examiner

SELECT CONTENT AUDIO PLAYBACK SYSTEM FOR AUTOMOBILES

CROSS-REFERENCE TO RELATED APPLICATIONS

This application is a continuation of U.S. patent application Ser. No. 10/180,249, filed Jun. 26, 2002, and entitled "SMART CAR RADIO." The entirety of the above-noted application is incorporated herein by reference.

TECHNICAL FIELD

The present invention relates generally to audio devices, and more particularly to systems and methods that facilitate audio on demand and mobile audio devices.

BACKGROUND OF THE INVENTION

Mobile audio is an important form of entertainment and information today. Mobile audio devices are often utilized in automobiles, at the gym, jogging and the like. People have come to rely on mobile audio devices (e.g., car radios, portable compact disc players, portable cassette players and the like) for entertainment and information content. Entertainment content generally relates to music, songs, radio talk shows, other various forms of entertainment and the like. Information content generally relates to information reports and/or updates such as news reports, traffic reports, weather reports and the like. However, this content is often not available when desired by a user.

As an example, traffic reports may not be received often enough to be of value for a typical commuter. The commuter needs to have current traffic reports to make travel decisions and if that information is not received in time or missed (e.g., by a user being distracted by traffic during a traffic report), the commuter cannot necessarily make proper decisions. News and weather reports can also lose value if not obtainable as/when desired by a user.

For entertainment, mobile devices can provide music or other forms of entertainment by utilizing a mobile device with a tuner to receive entertainment via radio broadcasts (e.g. AM and/or FM). Just as with information, desired entertainment may not be provided when/as desired. Radio stations are typically divided into certain styles of music allowing choice of style. However, current songs may not be desirable or there may be a commercial playing preventing a person from receiving desired content.

Conventional mobile audio devices can typically play audio media such as, compact disc audio (CDDA), cassette tapes and the like. However, these media fail to provide a substantially large collection of music. Additionally, the physical storage required for these media can be extensive. Finally, changing currently playing content can be difficult and/or even hazardous while driving a car or other activity.

There are some digital audio devices that expand the size of available entertainment content such as MP3 players. However, these devices require a large amount of configuration and control, which can be difficult to perform while driving. Alternately, playlists can be manually generated, in advance, to play desired content. However, such playlists can be time consuming to generate and cannot be readily generated by a user driving an automobile. Additionally, entertainment content desired can vary or change from the time the playlist(s) is manually generated to the time the playlist is utilized on the device.

Thus, current mobile audio devices can fail to timely provide entertainment and/or information content for users. Additionally, current mobile audio devices can be difficult for a user to employ to obtain desired content.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention provides a large-capacity user-defined audio content delivery system. The system delivers uninterrupted music and delivers information content (e.g., news) by evaluating and encoding an input audio stream while outputting another stream. Undesirable audio content (e.g. advertisements and unwanted news) are not present in the output audio stream as only desired portions of information content are stored for playback on demand. The invention also includes a user interface that is simple enough to facilitate utilization of the audio system in an automobile and employs standard hardware available in typical computing and/or personal digital assistant equipment. Additionally, the audio system can be portable (e.g., as portable as a personal digital assistant) and can be updated in real time or off line via a personal computer.

The present invention facilitates utilization of information content and entertainment content. Information content is captured and can be accessed to provide current reports such as news, traffic and weather reports. Entertainment content can be scanned to efficiently determine a user's preference function and then to identify media items (e.g., songs) according to the user's preference function.

The user interface provided by the present invention allows a user to select audio content by selecting a scan button and/or listen to current information reports by selecting at least one of a news button, weather button and a traffic button. The selection of the scan button initiates a scan function that permits a user to indicate desired listening preferences and to identify and play content similar to the indicated preferences. The selection of the news button, the weather button or the traffic button initiate playback of a current report.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
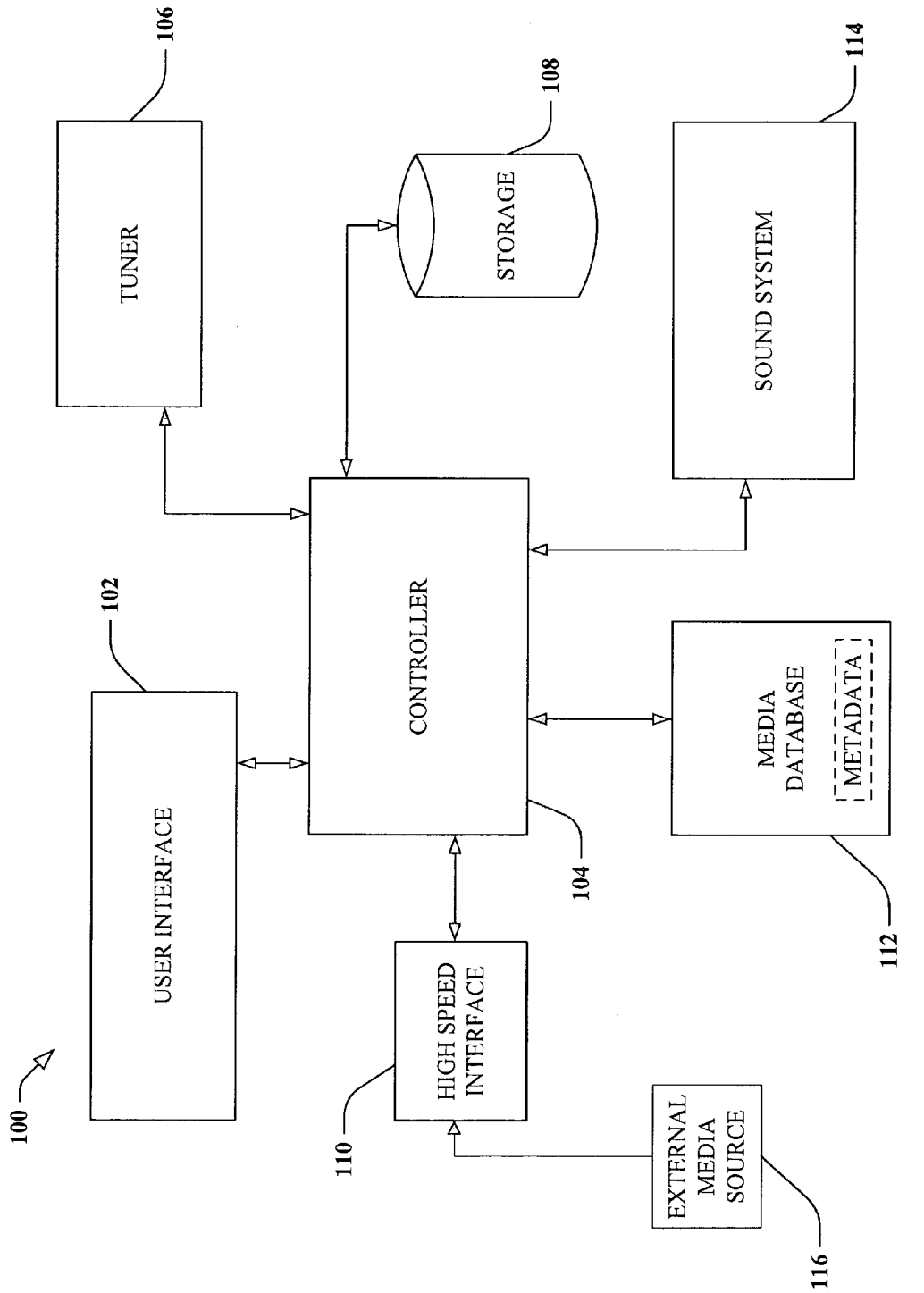
FIG. 1 is a block diagram of a mobile audio system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

It is to be appreciated that, for purposes of the present invention, any or all of the functionality associated with modules, systems and/or components discussed herein can be achieved in any of a variety of ways (e.g. combination or individual implementations of active server pages (ASPs), common gateway interfaces (CGIs), application programming interfaces (API's), structured query language (SQL), component object model (COM), distributed COM (DCOM), system object model (SOM), distributed SOM (DSOM), ActiveX, common object request broker architecture (CORBA), database management systems (DBMSs), relational database management systems (RDBMSs), object-oriented database management system (ODBMSs), object-relational database management systems (ORDBMS), remote method invocation (RMI), C, C++, practical extraction and reporting language (PERL), applets, HTML, dynamic HTML, server side includes (SSIs), extensible markup language (XML), portable document format (PDF), wireless markup language (WML), standard generalized markup language (SGML), handheld device markup language (HDML), graphics interchange format (GIF), joint photographic experts group (JPEG), binary large object (BLOB), other script or executable components).

Turning now to FIG. 1, a mobile audio system 100 in accordance with an aspect of the present invention is depicted. The system 100 facilitates user enjoyment and employment of media in accordance with the subject invention. The system 100 affords for delivery of uninterrupted media (e.g., music, news) as well as desired media via evaluating and encoding an input media stream while outputting another stream. More particularly, undesired media/content (e.g., advertisements and unwanted news) are not present in the output audio stream as only desired portions (e.g., subsets) of content are stored for playback on demand. Information content can be captured and accessed to provide current reports such as news, traffic and weather reports. Entertainment content can be scanned to efficiently determine a user's preference function and then to identify media items (e.g., songs) according to the user's preference function.

The system 100 includes a user interface 102, a controller 104, a tuner 106, a storage component 108, a high speed interface 110, a media database 112 and a sound system 114. The system 100 facilitates receiving and enjoying entertainment and information content. Current information content (e.g., news, weather, traffic and the like) and entertainment content (e.g., music) is obtainable on demand.

The user interface 102 is operative to enable a user to select, control and obtain content to be received and played. The user interface generally includes a control for selecting desired entertainment content and desired information content. The entertainment content includes sources such as music and/or audio books. The information content includes sources such as weather, traffic, news and the like. The controller 104 is generally operative to control the system 100. The controller 104 interfaces and/or controls other components of the system 100.

The high speed interface 110 is connected to the controller 104 and is connected to the external media source 116. The connection to external media source 116 can be intermittent. The high speed interface 110 is an interface that permits sufficient data transfer rates for the media items stored in the external media source 116 while external media source 116 is accessible. Media in external media source 116 can be copied into the media database 112 when external media source 116 is available. The high speed interface 110 can be implemented utilizing a mechanism such as a universal serial bus (USB), firewire, infrared and the like. Furthermore, networking technologies (e.g., wired and wireless) can also be employed for the high speed interface 110. Any suitable transfer rate can be employed for the high speed interface 110 so long as the media items can be accessed in a timely fashion. Some exemplary suitable transfer rates are 1 Mbit/s, 10 Mbit/s and 100 Mbit/s.

It is appreciated that the external media source 116 can be detached and removed from the system 100, swapped with another media source, be reattached to the system, and the like and still be in accordance with the present invention. Additionally, one or more additional media sources can be connected to the high speed interface 110 to add and/or modify the entertainment content available to the system 100.

External media source 116 can be comprised of devices such as compact disks (e.g., MP3 CDs), digital video disks (DVD), portable storage devices (e.g., hard drives), flash memory (e.g., smart media, compact flash, memory stick, multimedia memory and the like), personal digital assistants and the like. Alternatively, external media source 116 can be resident on the hard drive of a separate computer. In this case, the high speed interface is a network (either wired or wireless).

The media database 112 stores, maintains and provides a collection of media items (e.g., songs). The collection of media items can be relatively large. For example, a music collection of about 200 conventional compact discs in compact disc digital audio (CDDA) format can comfortably be compressed into about 5 Gbytes of data and stored on the media database 112. Additionally, the media database 112 also maintains metadata for respective media items. The metadata provides descriptive information and/or characteristics about the media item in the collection. The metadata includes information that characterizes the media item(s) and can include, for example, artist, song title, movie title, author, genre (e.g., folk, jazz, new wave, rock and the like), album and the like. In some aspects of the invention, the media item(s) include or incorporate metadata (e.g., via a tag or block of information at a specific location in a file) such as, for example, ID3 tags which include information characterizing digital audio files (e.g., mp3). Alternately, metadata can be generated for the media item(s) by analyzing aspects of the seed items such as, tempo, volume, instruments, vocals, in order to determine appropriate metadata for the respective media item(s). Additionally, metadata can be entered (e.g., by a user) for respective media item(s). Additional descriptions of metadata that can be employed with the present invention are provided with FIG. 6 and elsewhere in the description.

The tuner 106 is operative to selectably provide audio streams or audio content (e.g., analog or digital) to the controller 104. The tuner 106 is selectable via the user interface 102, the controller 104 and/or another external user interface (not shown) to select one of a plurality of stations or broadcasts. Generally, the tuner 106 can receive broadcasts (e.g., AM and/or FM radio broadcasts, satellite radio broadcasts, network broadcasts and the like) and obtain audio content from those broadcasts. The tuner 106 is configurable for turning on, turning off, selecting a particular station or broadcast, turning on at a specified time, turning off at a specified time and the like. Typically, respective broadcasts provide varying information and/or entertainment content (e.g., news radio stations, top 40 stations, sports talk radio stations and the like).

The storage component 108 permits short and/or long term storage of recorded content from the tuner 106. The recorded content is typically in a suitably compress format and can be accessed and/or provided as needed. Generally, a smaller amount of storage (e.g., about 15 Mbytes) can be employed for storing content from tuner 106 since the recorded content is substantially comprised of relatively short clips of information content (e.g., news reports, weather reports, traffic reports and the like). Information content (e.g., content that mostly contains voice) can generally be compressed more than other types of content such as songs or music and thus utilizes less storage space. Storage 108 can also be used to store media database 112.

The sound system 114 receives an audio stream (e.g., analog or digital) and "plays" the audio stream. The sound system 114 can be of a number of suitable devices such as, car radio, speaker system and the like. Furthermore, the sound system 114 can receive other audio streams from other components such as CD players, other tuners, car stereos, audio devices and the like. The sound system 114 can be configured to decode or decompress the audio stream and also, to provide the stream in digital and/or analog format.

As stated supra, the controller 104 is generally operative to control the system 100. The controller 104 interfaces and/or controls other components of the system 100. Additionally, the controller 104 receives user input from the user interface 102 and initiates a desired function (e.g., provide entertainment content and/or information content). Generally, the controller 104 receives directives to perform the following functions: scan entertainment content, provide news content, provide weather content, and provide traffic content. It is appreciated that alternate aspects of the invention can perform other, similar functions.

The scan entertainment content function is performed by playing segments of a sub-collection of the media database 112, also referred to as candidate seed items, until a user cancels the scan or indicates a desired media item or desired seed item. Segments that are bypassed (e.g., not selected as desirable by a user) are deemed to be undesirable media items or undesirable seed items. A segment that a user indicates as desirable is a desirable seed item. Subsequent to obtaining the desirable seed item, a playlist is generated that includes media items from the collection similar to the desirable seed item and dissimilar to the undesirable seed item(s). The playlist generally includes references or pointers to the media items, not the media items themselves. After being generated, the playlist is played by transferring (e.g., streaming), in the determined order, media items indicated by the playlist to the sound system 114.

The segments played are typically about 10 seconds each, but alternate aspects of the invention can utilize various lengths of time. Additionally, the segments are obtained so as to be representative of the media item and should be long enough to allow a typical user to correctly associate the segment with the associated candidate seed item (e.g., song). Generally, a more representative segment can be at a location of the song besides the beginning. A database of segment identifiers that indicate representative segments can be employed to obtain appropriate segments. Additionally, segments can simply start 30 seconds into a song. Other suitable approaches can be utilized with the invention. The sub-collection (the list of candidate seed items) is a selected subset of the media collection. Typically, the sub-collection is a small number of media items (e.g., 20 songs). A first element of the sub-collection is randomly selected. However, the first element should have a sufficient amount of metadata and have a sufficient amount of similarity to other media items (e.g., sub-genre) to allow it to serve as a seed for generating a playlist (as explained below). The second element of the sub-collection is chosen so as to be substantially dissimilar to the first element. Subsequent elements are iteratively chosen so as to be dissimilar to several previous elements. Thus, the effect is that a user is more likely to identify a desirable song faster. As an example, some possible elements could be a first element of a hard rock type, a second element of classical music type, a third element of dance music type and so on. Additional details on selecting elements for the sub-collection are described infra.

As discussed supra, bypassed segments are deemed to indicate undesirable media items, also referred to as undesirable seed items and a selected segment (e.g., by a user clicking a scan button while that segment is playing) is deemed to indicate a desirable media item, also referred to as a desirable seed item. Thus, zero or more undesirable seed items are obtained and one desirable seed item is obtained. It is appreciated that alternate aspects can include additional desirable seed items (e.g., by a user clicking a scan button for desirable items and pressing and holding the scan button for a final desirable seed item).

After obtaining the seed item(s), a preference function is generated based on the undesirable seed items and desirable seed item. The preference function represents a user's desired and undesired entertainment content. Individual items of the media collection are then compared with the preference function to identify those items that are similar or in relation to that desired by the user.

The provided information function, discussed supra, includes a request for information content such as, news, traffic and weather. Typically, the request is initiated by a user selecting or clicking an appropriate button (e.g., a weather button). On receiving such a request, a recent or most recent recorded report of a requested type is played via the sound system 114. For example, on receiving a request for a weather update, a recently recorded weather report is played for the user.

The controller 104 also receives and records information content such as, news, traffic and weather. The controller 104 interfaces with the tuner 106, and determines when a particular report is occurring, records the report and stores the report in the storage component 108. Typically, information reports (e.g., weather update) occur on a regular basis (e.g., every 10 minutes or so) or have an associated signature (e.g., jingle). Thus, one possible approach to recording respective subsets of broadcasted media is to "turn on" and select the appropriate broadcast at the regular or expected time. Once time for the broadcasted media has elapsed, the recording of the media subset is ended. Another approach is to continuously scan one or more broadcasts for identifying jingles or signatures. On identifying a signature, a corresponding media is recorded until an ending signature is detected or a predetermined amount of time has elapsed. Other suitable approaches for scheduling and recording media can be utilized and still be in accordance with the present invention. Additionally, information such as tables of schedules, identifying jingles, electronic programming guide and the like can be maintained in the storage component 108 in order to facilitate recording media. This information can be periodically updated via the high speed interface 110 or the tuner 106 (via a selected broadcast).

Finally, the recorded form of the media is in, or is converted to, a suitable compressed format prior to storing. Some exemplary suitable compressed formats are MP3, Windows Media Audio and the like. Additionally, only a number of recent recorded broadcasts are typically maintained for a given information type. For example, the last 2 traffic reports can be maintained and previous traffic reports discarded, thus conserving storage space for the storage component 108. It is appreciated that information content, such as traffic reports, can become unnecessary or less desirable after a certain amount of time (e.g., yesterday's traffic report is substantially irrelevant to today's traffic report).

Figure 2:
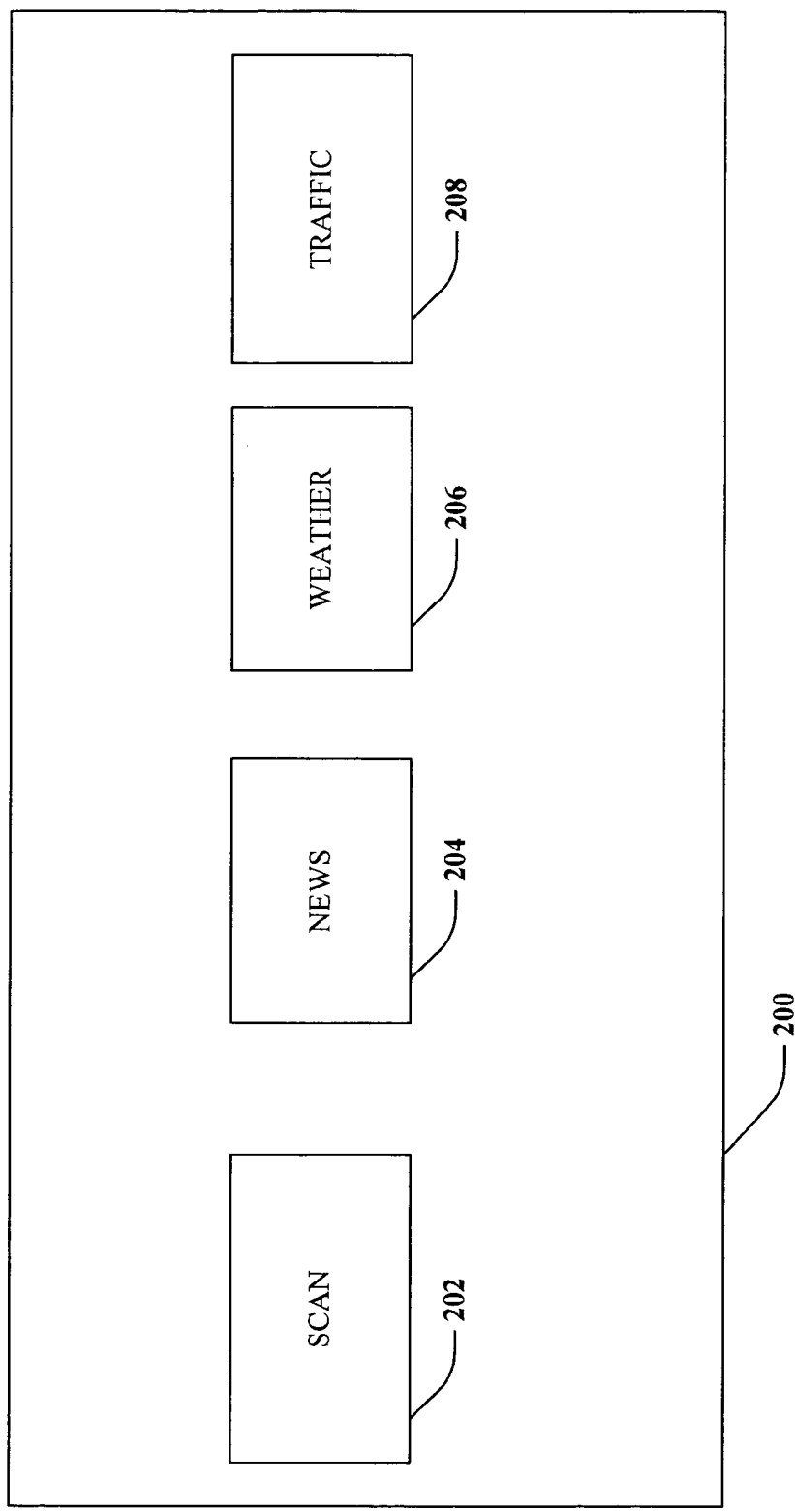
FIG. 2 is a block diagram of a user interface in accordance with the present invention.

FIG. 2 is a block diagram illustrating a user interface 200 in accordance with an aspect of the present invention. The user interface 200 can be employed with an audio system such as system 100 of FIG. 1. The user interface 200 depicted is but one possible implementation and other implementations can be conceived and still be in accordance with the present invention.

The user interface 200 includes selectable user items: a scan button 202, a news button 204, a weather button 206, and a traffic button 208. The user items can be implemented in a number of suitable means. The user interface 200 can be a "touch sensitive" screen (e.g., liquid crystal display (LCD)) wherein a user selects an item by touching the display in an area defined by the various items (e.g., scan button 202). Additionally, the user interface 200 can include a series of physical push buttons wherein a user selects an item by pushing a corresponding button.

The scan button 202 is selected to initiate a scan of entertainment content (e.g., media items). Segments of a subset of a collection of media items are played for a user. The segments are relatively short (e.g., 10 seconds) versions of respective media items, but long enough to permit a user to decide whether or not the media item is desirable. On a user identifying a segment as desirable, the user selects the scan button 202 a second time so as to identify the respective media item as desirable (e.g., a desirable seed item). The desired media item continues playing without interruption. Segments that are played without the user indicating them as desirable (e.g., selected the scan button a second time), are deemed to be undesirable seed items. Subsequently, a preference function is generated based on the desirable and undesirable seed items. This preference function is then compared with remaining media items (e.g., media items that have not been played) to generate a playlist of items that include media items (e.g., songs) that are similar to the desirable seed item and dissimilar to the undesirable seed item(s). Media items identified in the playlist are played, in order, after the desired media item is done playing.

The news button 204 is selected to initiate playback or a current news report. The current news reported is recorded and stored and then accessed on the news button 204 being selected. The current news report can include typical news information such as, but not limited to, world news, business news, top stories, sports news, entertainment news, political news, and the like. The weather button 206 is selected to initiate playback of a current weather report. The current weather report is recorded and stored in a similar fashion to the current news report. The weather report can include typical weather information such as, local temperatures, local forecast, regional forecast, extended forecast, current conditions (e.g., temperature, precipitation, . . . ), and the like. The traffic button 208 is selected to initiate playback of a current traffic report. The current traffic report is recorded and stored in a similar fashion to the current news report. The traffic report can include typical traffic information like, traffic flow, construction reports, accident reports, and driving conditions.

Figure 3:
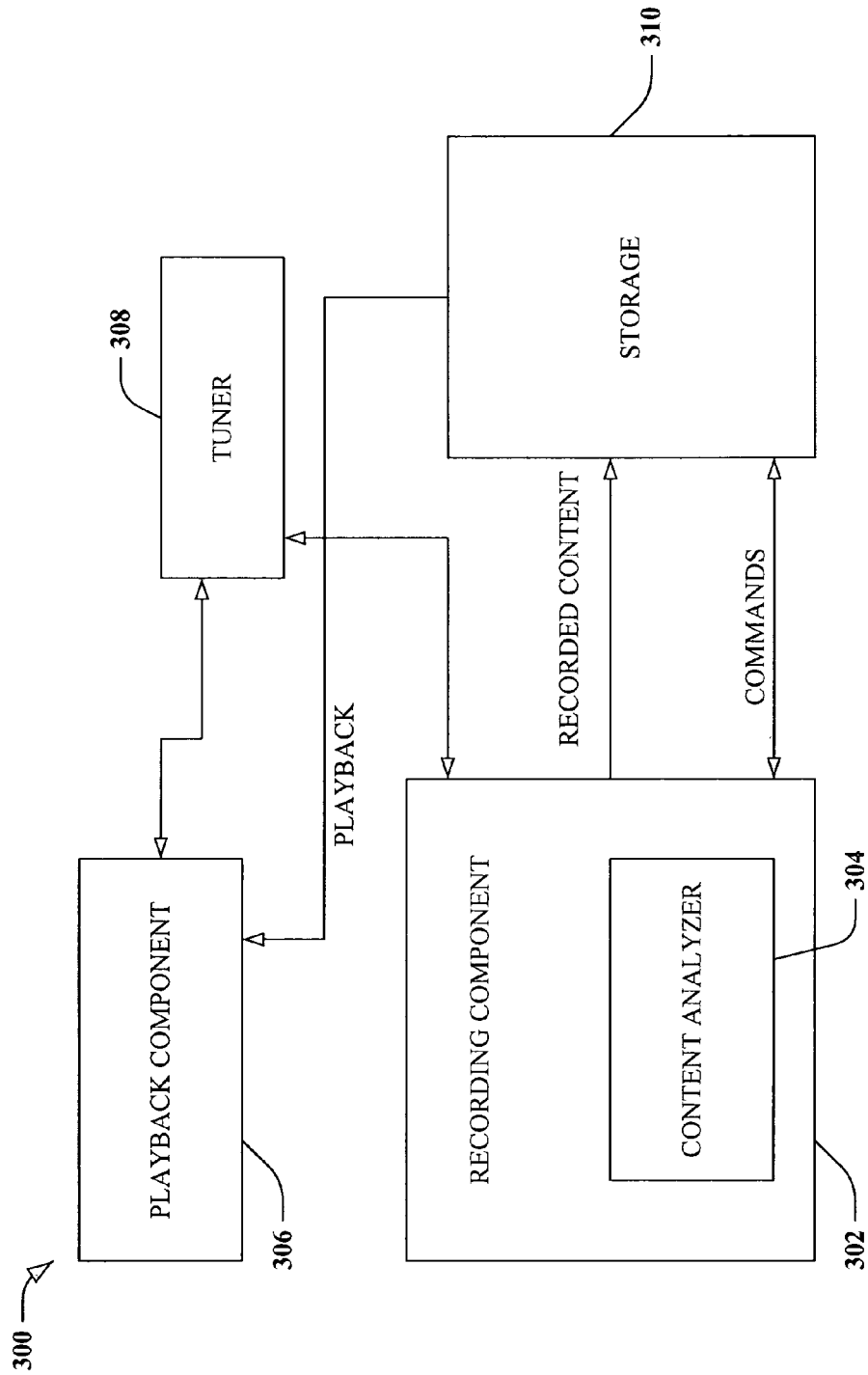
FIG. 3 is a block diagram of a system that facilitates recording information content in accordance with the present invention.

Turning now to FIG. 3, a system 300 that facilitates recording and playing information content in accordance with an aspect of the present invention is depicted. The system 300 includes a recording component 302, the recording component 302 comprising a content analyzer 304, a playback component 306, a tuner 308 and a storage component 310. The system 300 is operative to selectively record desired broadcasts (e.g., information content) and playback or provide those broadcasts on demand.

The tuner 308 is configured to selectably provide audio streams or audio content (e.g., analog or digital) to the recording component 302. The tuner 308 can be controlled via a user interface (not shown), the recording component 302 and/or another external user interface (not shown) to select one of a plurality of stations or broadcasts. Generally, the tuner 308 can receive broadcasts (e.g., AM and/or FM radio broadcasts, satellite radio broadcasts, network broadcasts and the like) and obtain audio content from those broadcasts. The tuner 308 is configurable for turning on, turning off, selecting a particular station or broadcast, turning on at a specified time, turning off at a specified time and the like. Additionally, the tuner 308 is operative to select and provide audio content for multiple broadcasts simultaneously (e.g., can provide separate audio streams for a news and weather report occurring simultaneously on two distinct stations). Typically, respective broadcasts provide varying information and/or entertainment content (e.g., news radio stations, top 40 stations, sports talk radio stations and the like).

The storage component 310 permits short and/or long term storage of recorded content from the tuner 308, via the recording component 302. The recorded content is typically in a suitably compressed format and can be accessed and/or provided as needed. Generally, a relatively small amount of storage (e.g., about 15 Mbytes) is utilized for storing content from tuner 308 since the recorded content is substantially comprised of relatively short clips of information content (e.g., news reports, weather reports, traffic reports and the like). Information content can generally be compressed more than other types of content such as songs or music and thus utilizes less storage space.

The playback component 306 receives an audio stream (e.g., analog or digital) or content from the storage component 310 and "plays" the audio stream. The playback component 306 can be a of a number of suitable devices such as, car radio, speaker system and the like. The playback component 306 can receive other audio streams from other components such as CD players, other tuners, car stereos, audio devices and the like. The playback component 306 can be configured to decode or decompress the audio stream and to provide the stream in digital and/or analog format.

The recording component 302 receives and records information content such as, news, traffic and weather from the tuner 308. The recording component 302 interfaces with the tuner 308, and determines when a particular media is occurring, records the media and stores at least a subset of the media in the storage component 310. Typically, information reports (e.g., news update) occur on a regular basis (e.g., every 10 minutes or so) or have an associated jingle. Thus, one possible approach to recording respective media is to "turn on" and select the appropriate broadcast at the regular or expected time. Once time for the report has expired, the recording of the report is ended. Additionally, the content analyzer 304 continuously scans one or more broadcasts (e.g., several stations) for identifying jingles (e.g., a starting jingle). A jingle is a commonly utilized "signature" for news reports by radio stations. On identifying a jingle, a report is recorded until the content analyzer 304 detects an ending jingle and/or a predetermined amount of time has elapsed. The detection of a jingle can be accomplished with a stream audio fingerprinting system, such as that described in the paper "Extracting Noise-Robust Features from Audio Data" by C. Burges, J. Platt, and S. Jana, appearing in ICASSP 2002, pages I1021-I1024. Other suitable approaches for scheduling and recording reports can be utilized and still be in accordance with the present invention. Additionally, information such as tables of schedules, identifying jingles, electronic programming guide and the like can be maintained in the storage component 310 in order to facilitate recording reports. This information can be periodically updated via a suitable mechanism such as the tuner 308 (via a selected broadcast). In an alternate aspect of the invention, the content analyzer 304 is trainable so that a user can initiate training for a currently playing report.

The recorded reports are then compressed to a suitable compressed format prior to storing. Some exemplary suitable compressed formats are MP3, Windows Media Audio and the like. Then, the newly recorded report is stored on the storage component and a previously recorded report of the same type is discarded (e.g., previous traffic report replaced by new traffic report). Alternate aspects of the invention can maintain a number of recent recorded broadcasts a given information type. For example, the last 2 traffic reports can be maintained and previous traffic reports discarded. By discarding previously recorded reports, storage space is conserved thereby reducing implementation costs.

Figure 4:
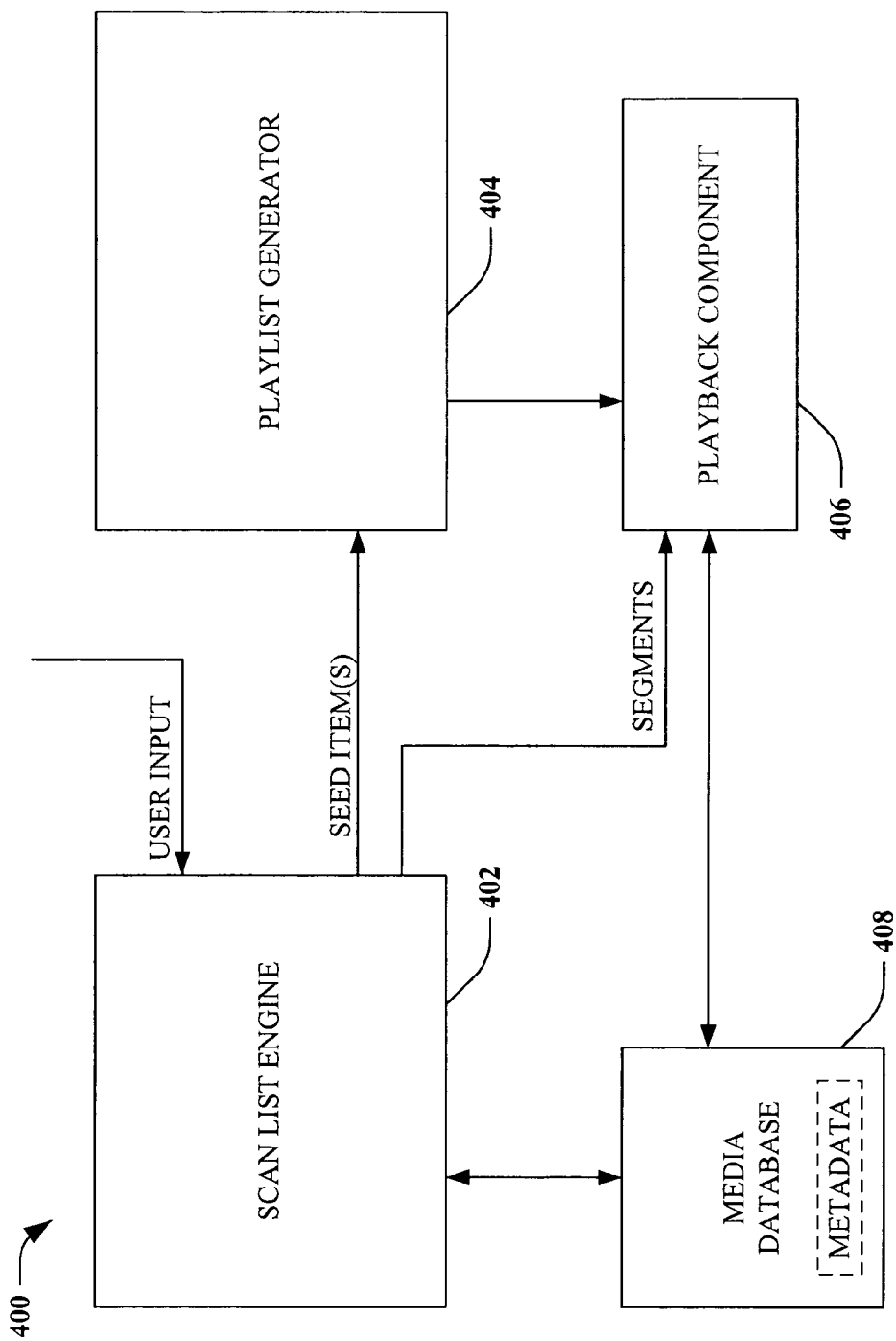
FIG. 4 is a block diagram of a system that facilitates accessing and identifying entertainment content in accordance with the present invention.

FIG. 4 is a block diagram depicting a system 400 that facilitates accessing and identifying entertainment content in accordance with an aspect of the present invention. The system 400 obtains seed item(s) and plays or provides media items (e.g., songs) from a library or collection of media items. The system 400 receives user input describing preferences and provides those media items that are in accordance with the indicated preferences. The system 400 includes a scan list engine 402, a playlist generator 404 and a playback component 406.

The scan list engine 402 is operative to receive the user input comprising a first input and a second input. The user input is generally provided via a suitable user interface (not shown). The first input initiates a scan operation and the second input identifies a desirable media item (e.g., seed item) and ends the scan operation.

The scan operation is performed by playing segments of a sub-collection of the media collection, stored in the media database 408, until a user cancels the scan or indicates a desired media item or desired seed item via the second input. Segments that are bypassed (e.g., not selected as desirable by a user) are deemed to be undesirable media items referred to as undesirable seed items.

Figure 7:
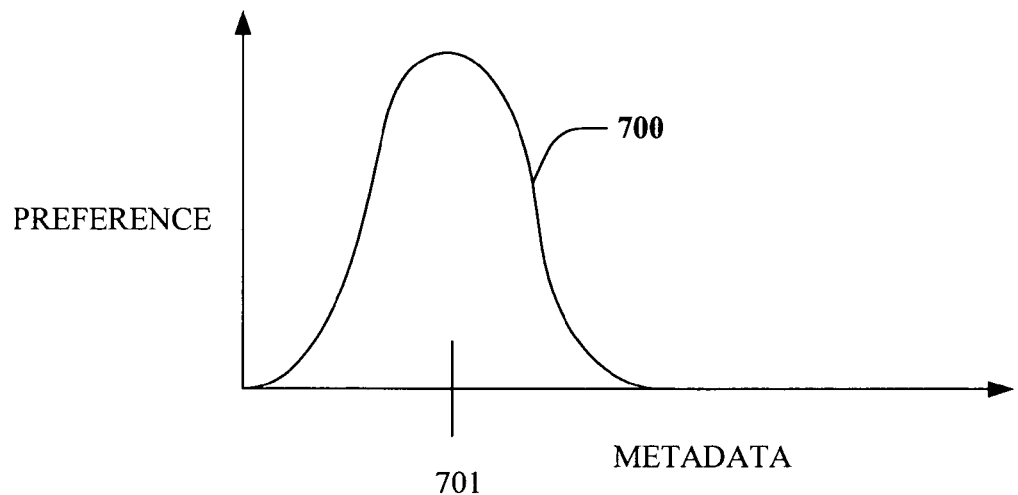
FIG. 7 illustrates a preference function obtained for a seed item in accordance with the present invention.
Figure 8:
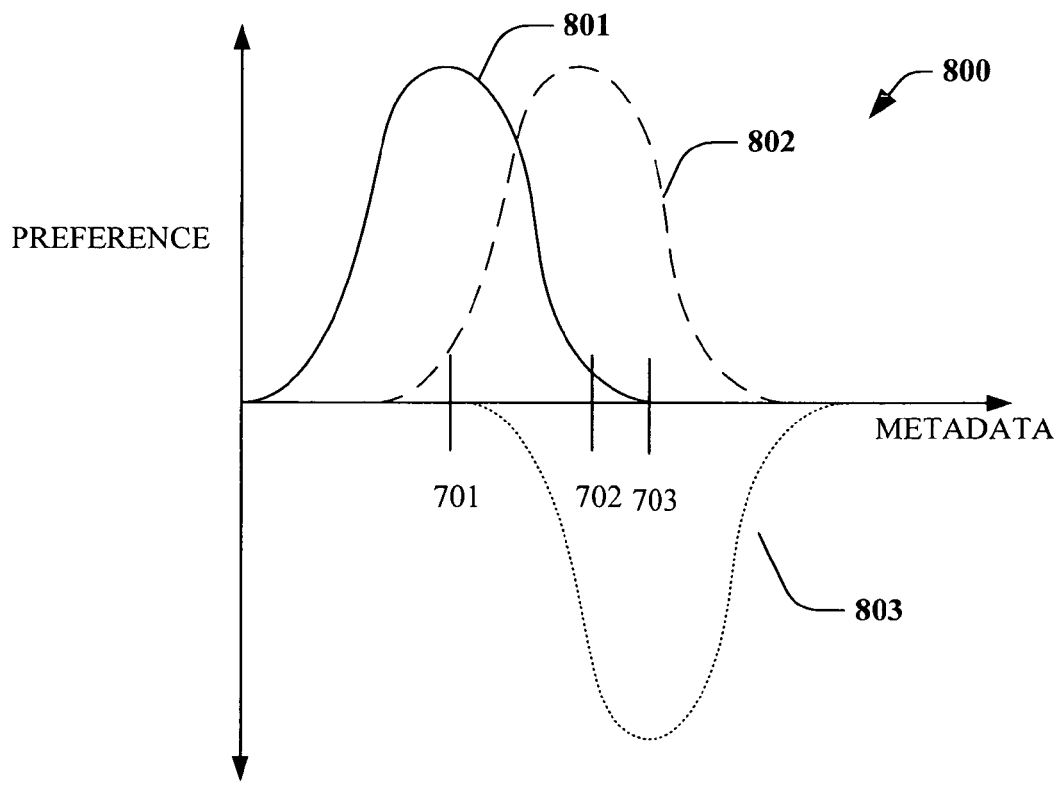
FIG. 8 illustrates a preference function obtained for seed items in accordance with the present invention.
Figure 9:
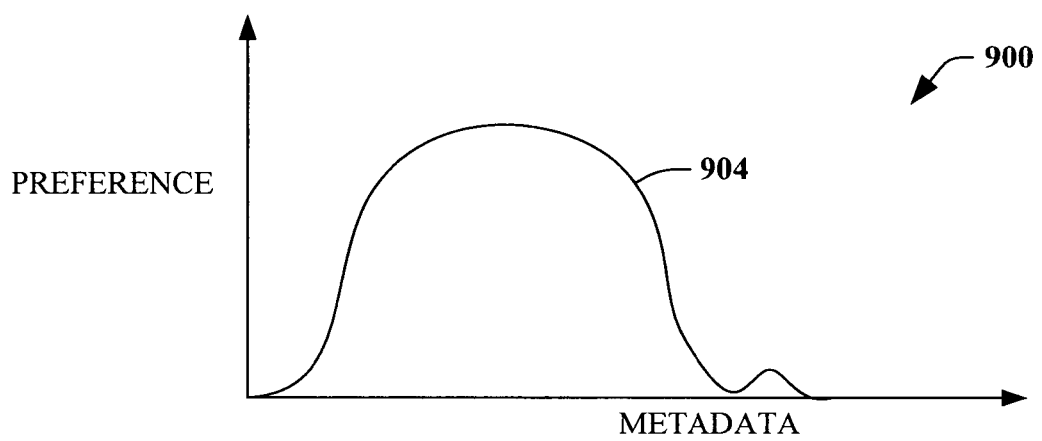
FIG. 9 illustrates a composite preference function obtained for seed items in accordance with the present invention.

The seed item(s) are received by a playlist generator 404 that generates the playlist that includes media items from the collection similar to the desirable seed item and dissimilar to the undesirable seed item(s). The playlist generally includes references or pointers to the media items. After being generated, the playlist is played by transferring (e.g., streaming), in a specified order, media items indicated by the playlist to the playback component 406. The playlist is generated by computing a preference function that accounts for desirable and undesirable seed items. Additional approaches that the playlist generator 404 can employ to generate a playlist from seed item(s) are disclosed infra. Further, a graphical representation of a preference function is depicted in FIGS. 7-9.

Referring once again to the scan list engine 402, the segments played are typically about 10 seconds each, but alternate aspects of the invention can utilize various lengths of time. Additionally, the segments are identified so as to be representative of the media item. A more representative segment can be at a certain location of the song. A database of segment identifiers can be employed to obtain appropriate segments. Additionally, segments can simply start 30 seconds into a song. Other suitable approaches can be utilized with the invention.

The sub-collection, also referred to as candidate seed items, is a selected subset of the media collection and is typically a small number of media items (e.g., 20 songs). A first element of the sub-collection is randomly selected. However, the first element should have a sufficient amount of metadata and have a sufficient amount of similarity to other media items (e.g., sub-genre) to allow it to serve as seed for a playlist (as explained below). The second element of the sub-collection is chosen so as to be substantially dissimilar to the first element. Subsequent elements are iteratively chosen so as to be dissimilar to several previous elements. Thus, the effect is that a user is more likely to identify a desirable song faster. As an example, some possible elements could be a first element of a hard rock type, a second element of classical music type, a third element of dance music type and so on. Additional details on selecting elements for the sub-collection are described infra.

One approach to obtaining the sub-collection is described here, however other suitable approaches can be employed and still be in accordance with the invention. A temporary list of media items is initialized. A number of media items are randomly selected from the media database 408 (e.g., 20 songs) and added to the temporary list. It is appreciated that a larger number of media items can be utilized (e.g., even the whole collection), however a smaller number of media items can accelerate the process. Media items that do not have or contain metadata (e.g., unknown artist, unknown title) are then removed from the temporary list. Additionally, uncommon media items are removed from the temporary list. Then, similarities are computed for respective media items in the list to all other media items in the list of candidate seed items. Then, a next item for the list of candidate seed items is chosen by identifying a media item from the temporary list that is least similar to all previous item on the list of candidate seed items. The process is then iterated a number (e.g., 40) of times.

The uncommon media items are those media items that are not similar to a minimal number of other media items. One approach is to determine whether a media item is similar to at least 5 other media items (e.g., has 5 other media items in its subgenre) and if it is not, the media item is deemed uncommon and removed from the temporary list.

It is appreciated that identity for media items is not necessarily fully known. For example, a media item may have a known artist or author, but it cannot be identified specifically. For this case, similarity of an item with missing track to another item can be obtained by computing an average of similarity for known items by the artist to the other item. The following equation can be employed to compute this average:

$$\frac{1}{N}\sum_{n=1}^{N} K(\text{known } item_n \text{ by } artist_1, \text{ other item})$$

where N is a number of media items by artist₁ (the known artist of the first item), and K is a similarity function between two known items. N can be all items known by the first artist, but is typically limited to a maximum number (e.g., 200) so as to decrease computations.

Another special case is where there are 2 unknown media items for 2 known artists (artist₁ and artist₂). The following equation can be employed to compute a similarity value between the 2 unknown media items by computing an average for the known artists.

$$\frac{1}{NM}\sum_{n=1}^{N}\sum_{m=1}^{M} K(\text{known } item_n \text{ by } artist_1, \text{ known } item_m \text{ by } artist_2)$$

where N is a number of known media items by artist₁ and M is a number of known media items by artist₂ and K is again a similarity function between two known items. N and M can be all known items for the respective artists but is typically a limited to a maximum number (e.g., 30) so as to decrease computations.

In the determination of uncommon media items, supra, the subgenre for media items with uncertain identity must be sometimes computed. The computation of subgenre for such media items is described here, and is similar to the computation of similarity for such items which uses a specific K function. Namely, the subgenre similarity between two known items is 1 if they have the same subgenre, 0 otherwise. The subgenre between two partially known items is thus computed by the procedure described supra for this definition of K. A media item is considered uncommon if the sum of its subgenre similarities to the rest of the media database 112 is less than a pre-determined threshold (e.g., 5).

As discussed supra, bypassed segments are deemed to indicate undesirable media items, also referred to as undesirable seed items and a selected segment (e.g., by a user clicking a scan button while that segment is playing) is deemed to indicate a desirable media item, also referred to as a desirable seed item. Thus, zero or more undesirable seed items are obtained and one desirable seed item is obtained. It is appreciated that alternate aspects can include additional desirable seed items (e.g., by a user clicking a scan button for desirable items and pressing and holding the scan button for a final desirable seed item).

After obtaining the seed item(s), a preference function is generated based on the undesirable seed items and desirable seed item. The preference function represents a user's desired and undesired entertainment content. Individual items of the media collection are then compared with the reference function to identify those items that are similar or in relation to that desired by the user. A more in depth description of computing a preference function is described infra.

Figure 5:
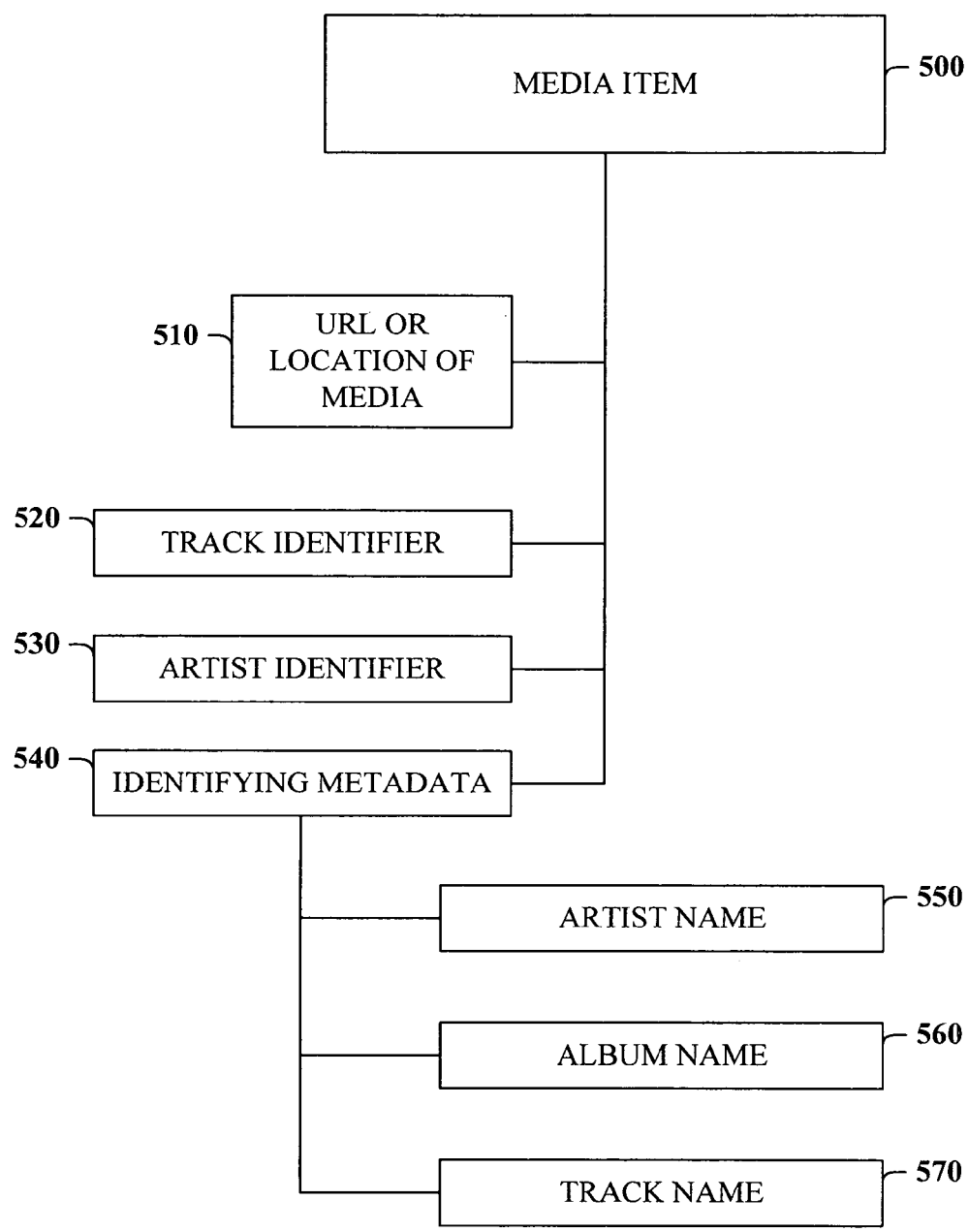
FIG. 5 illustrates exemplary information associated with a media item in accordance with the present invention.

Turning now to FIG. 5, an example of information associated with a media item 500 is illustrated. The exemplary information associated with the media item 500 includes a pointer 510 (e.g., universal resource locator, filename, . . . ) indicating the location of the media item 500 and permitting access to the media item. Alternately, the metadata can be included with media item 500 itself (e.g., by a 128 bit tag at the end of a file). Although the present invention is described primarily in relation to songs or audio, it is to be appreciated that the media items can include, but are not limited to, songs, movies, music videos, documents, books, poems, images (e.g., photographs), for example. The media item 500 is also associated with a unique track identifier 520 and a unique artist identifier 530. The media item 500 is also associated with identifying metadata 540. For a song, the identifying metadata 540 may include an artist name 550, an album name 560 and a track name 570. By way of illustration, the artist name 550 may be the name of a solo artist who performed a song or the name of a group that performed the song and an associated list of group members. By way of further illustration, the album name 560 may be the name of the album on which the song appeared and other information like the release date of the album. The track name 570 can include the name of the song, the length of the song, the amount of time between the first note of the song and the first lyric (if any) and the size (e.g., in kilobytes) of the song, for example. Such metadata (e.g., artist, album, track) can be employed to generate unique identifiers. Since the metadata can vary between metadata databases, inexact matching between items may be required. The unique identifiers can refer, for example, to one or more rows in a reference metadata database. In the case of a song, an item identification process attempts to assign a unique track identifier (e.g., 520) and a unique artist identifier (e.g., 530) to media items to facilitate, for example, accessing, storing and/or manipulating songs identified by the unique identifiers.

Figure 6:
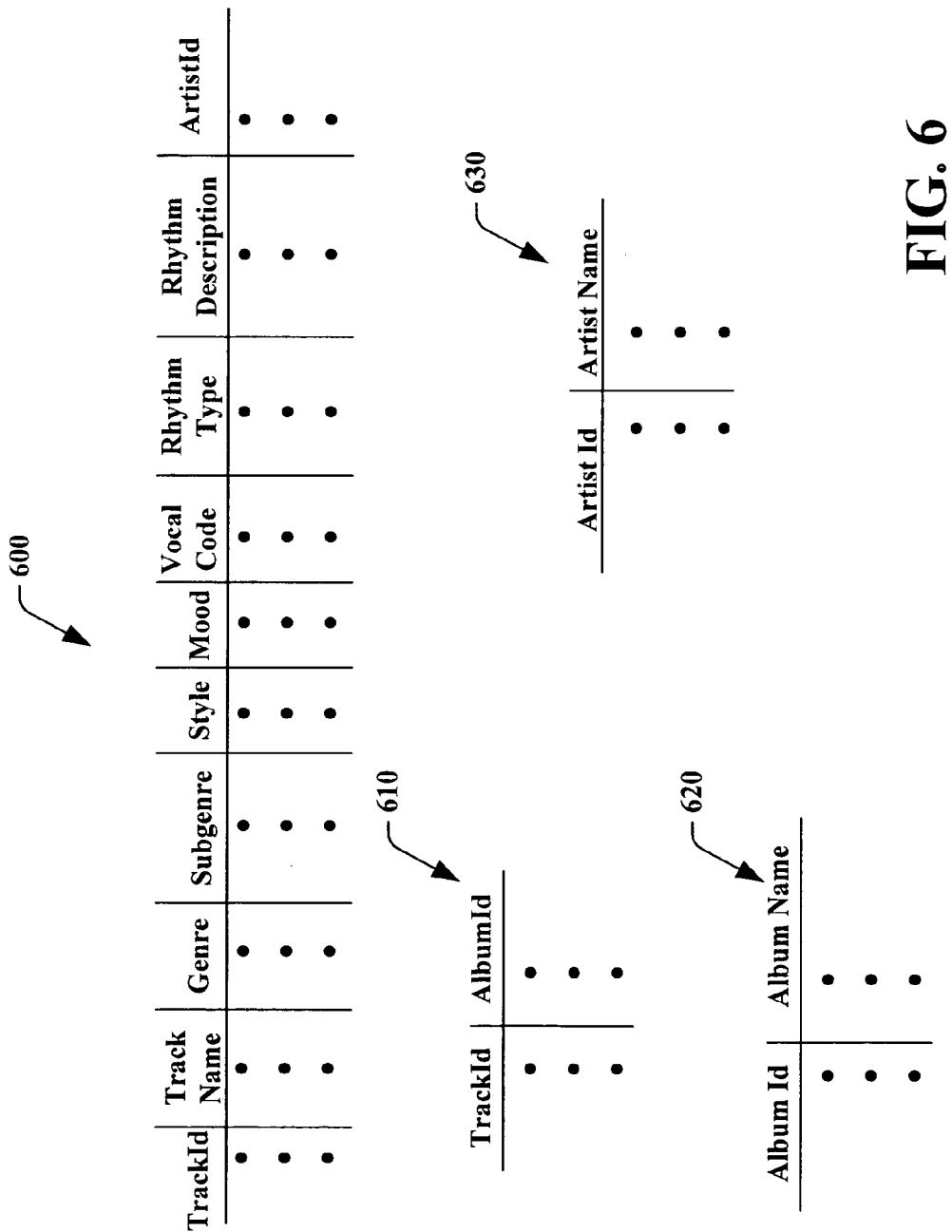
FIG. 6 illustrates exemplary metadata in accordance with the present invention.

FIG. 6 illustrates an exemplary reference metadata database schema in accordance with one particular aspect of the present invention. The sample reference metadata database includes four tables, although it is to be appreciated that other reference metadata databases may employ a greater or lesser number of tables. Table 600 illustrates per track metadata for songs (e.g., media items). Thus, table 600 includes a unique track identifier field, a unique artist identifier associated with the unique track, a track name, a genre, a subgenre, a style, a mood, a vocal code, a rhythm type and a rhythm description. Table 610 stores many-to-many relationships between tracks and albums, where each row is an occurrence of a track on an album. Table 620 represents albums, where an album is associated with a unique album identifier and an album name. Table 630 represents artists, where an artist is associated with a unique artist identifier and an artist name. To speed database access associated with the tables 600, 610, 620 and 630, indices on the unique identifiers and full-text indexing of names can be employed. Although the tables 600, 610, 620 and 630 are illustrated in the sample reference metadata database schema, it is to be appreciated that in a different embodiment of the present invention, the item identification system does not employ such tables and rather interacts directly with artist and track metadata or utilizes a different schema, as in the case of movies, documents, or books.

FIGS. 7, 8 and 9 illustrate graphical representations of exemplary preference functions. It is appreciated that the present invention is not limited to the preference functions illustrated in FIGS. 7-9. FIG. 7 depicts a preference function 700 obtained for a first desirable seed item 701. FIG. 8 depicts individual preference functions 801, 802, and 803 obtained for the first desirable seed item 701 along with a second desirable seed item 702 and an undesirable seed item 703. FIG. 9 illustrates a composite preference function 900 for a composite 904 of the first desirable seed item 701, the second desirable seed item 702 and the undesirable seed item 703. Such a composite preference function can be a linear blend of the three preference functions 801, 802, and 803. The preference function 900 can be employed, as discussed herein, to identify similar tracks. The composite preference function can then be employed as the preference function for the playlist generator 404 of FIG. 4.

Figure 10:
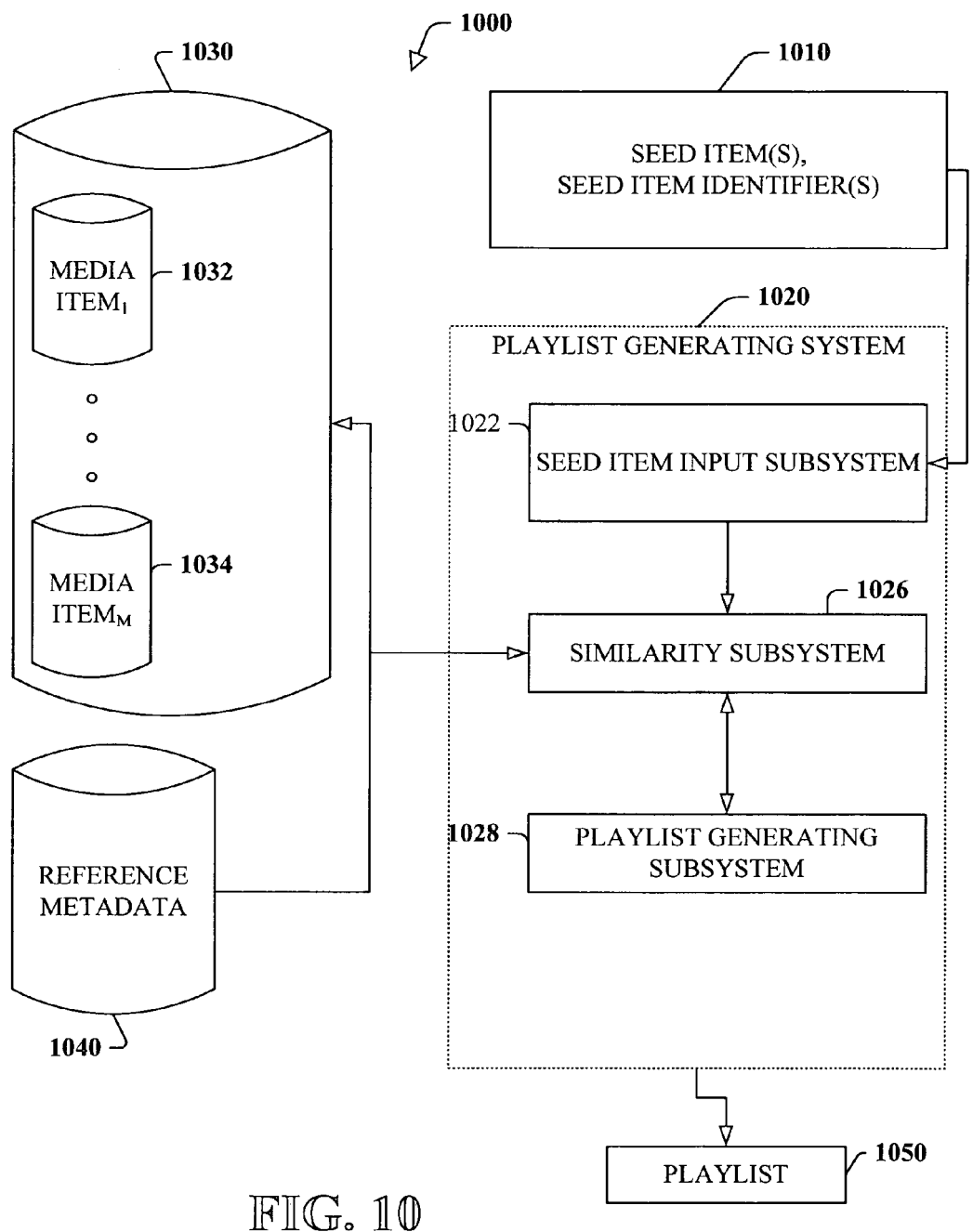
FIG. 10 is a block diagram of a system that facilitates playlist generation utilizing seed items in accordance with the present invention.

FIG. 10 illustrates a system 1000 that facilitates playlist generation by utilizing seed item(s). The seed item(s) (e.g., unique identifiers), include positive seed item(s) (e.g., desired) and negative seed item(s) (e.g., undesired) and indicate a degree of similarity and/or dissimilarity between the seed item(s) and one or more candidate media items. The system 1000 includes a user data store 1030 that contains one or more media items (e.g., MEDIA ITEM$_1$ 1032 through MEDIA ITEM$_M$ 1034, M being an integer), also referred to as a collection or library. The media items can include items like songs, audio books, movies, music videos, documents, electronic books and the like. The system 1000 includes a playlist generating system 1020 that can have one or more subsystems (e.g., seed item input subsystem 1022, similarity subsystem 1026, playlist generating subsystem 1028) that are employed to produce a playlist 1050. The playlist 1050 can include one or more media items and/or data sufficient to identify and/or retrieve one or more media items, where the media items are placed in the playlist 1050 based on a similarity criterion between the media items and the seed item(s).

The playlist-generating system 1020 can accept as input seed item(s) and/or seed item identifier(s) 1010 (e.g., from the scan list engine 402 of FIG. 4). The seed item(s) 1010 can be accepted by the seed item input subsystem 1022 which can perform pre-processing on the seed item information 1010 (e.g., validation, formatting) before passing it to the similarity subsystem 1026, which can compare descriptive metadata associated with the seed item(s) 1010 to descriptive metadata associated with the candidate media item to determine a degree of similarity that can be employed by the playlist generating subsystem 1028 to determine whether the candidate media item should be included in the playlist 1050. In one example of the present invention, the user data store 1030 and the playlist generating system 1020 reside on a client system. The similarity system 1026 may access the user data store 1030 and a reference metadata data store 1040 to make the determination of similarity.

Figure 11:
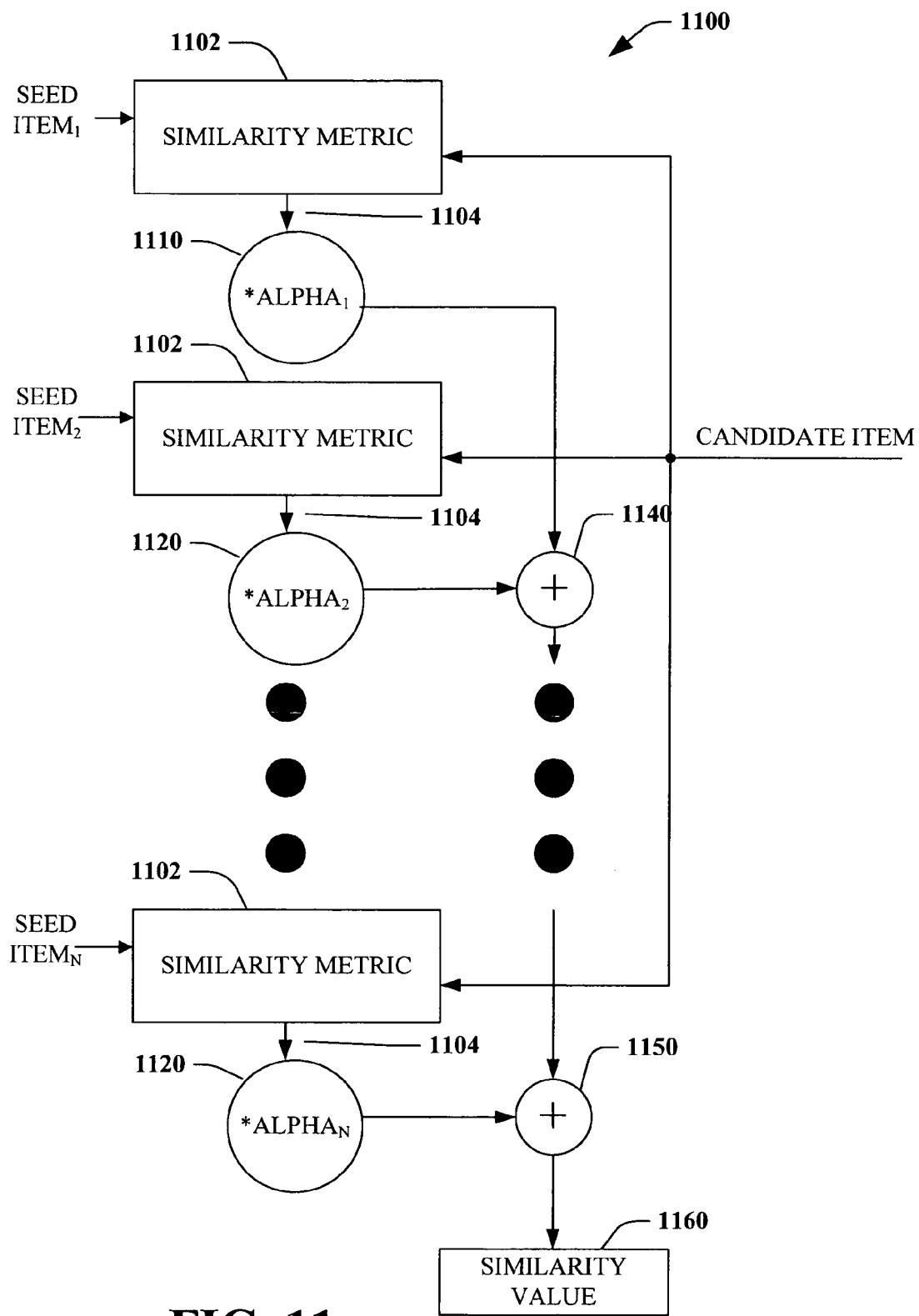
FIG. 11 is a block diagram of a similarity subsystem that facilitates playlist generation in accordance with the present invention.

Turning now to FIG. 11, a similarity subsystem 1100 is depicted that computes a similarity value 1160 in accordance with an aspect of the present invention. The similarity subsystem 1100 can be employed to, for example, generate playlists and/or to generate a sub-collection of media items (e.g., for use by the scan list engine 402 of FIG. 4). N seed items are compared to a candidate item from a collection or library by comparing each seed item individually to the candidate item by similarity metric(s) 1102 to obtain a similarity value(s) 1104. The similarity value 1104 is a value that indicates similarities between the candidate item and a respective seed item. A suitable scheme, such as is described in further detail with respect to FIG. 7, is utilized to obtain the similarity metric(s) 1102. The similarity value(s) 1104 computed for each seed item is then multiplied by N weights 1120; alpha$_1$, alpha$_2$, . . . alpha$_N$ and then summed together to produce a final similarity value 1160 which can then be employed with system 100 of FIG. 1, system 400 of FIG. 4 (e.g., playlist generator 404) and/or other suitable systems for generating playlists in accordance with the present invention. Generally, if the similarity value 1160 exceeds a threshold amount, the candidate item is added to a playlist and if it does not, it is not added to the playlist. Subsequently, a next candidate item, if present, is then processed by the subsystem 1100.

The weights 1120 can be generated via a variety of suitable approaches. One suitable approach is to simply assign the respective weights 1120 as +1. This approach results in the similarity value 1160 that is an average of the respective similarity metric(s) 1102. Another approach is to assign the respective weights 1120 as +1 for indicating that a seed item is desirable (e.g., by selecting a scan button during a segment) and as −1 for indicating that a seed item is undesirable (e.g., by not selecting the scan button during a segment). This approach produces the similarity value 1160 that is a function of desirable and undesirable seed items. Yet another approach is to assign the respective weights 1120 by selected values from a range (e.g., +1 to −1). The respected weights 1120 can be selected or input by a user (e.g., by a user selecting a weight for an added or removed item). Thus, larger weights (in absolute value terms) have more of an effect on the final similarity value 1160 than smaller weights.

However, it is possible that one or more of the seed item(s) are also candidate items. Thus, the weights are computed such that if the candidate item is the same as one of the desirable seed items (e.g., added), the resulting similarity is exactly 1 while if the candidate item is the same as one of the undesirable seed items (e.g., removed), the resulting similarity is exactly 0. Alternatively, if the user has expressed a non-binary target preference (between 0 and 1), then the resulting similarity should match the target preference. This computation can be represented as a linear system. Let the vector $b_i=1$ if the ith seed item has been added, 0 if it has been removed (or, more generally, $b_i$=the target preference value for the ith seed item). Then, let $K_{ij}$ be the matrix of similarities produced when the similarity metric 1102 is applied to the ith and the jth seed items. Then, assuming that the matrix $K_{ij}$ is invertible, the $\alpha_j$ (weight corresponding to the jth seed item) can be solved by solving the linear system:

$$\sum_j K_{ij} \alpha_j = b_i \qquad (1)$$

Given the seed item(s), Eq. 1 is only required to be solved once to obtain $\alpha_j$ since it is a linear system. If the matrix $K_{ij}$ is not invertible, other methods can be employed to obtain a solution. One method is to add a small offset to the diagonal of $K_{ij}$ to make it invertible:

$$\sum_j (K_{ij} + \sigma \delta_{ij}) \alpha_j = b_i \qquad (2)$$

Additionally, other methods, such as singular value decompositions can be utilized to obtain the solution.

It is also appreciated that the subsystem 1100 can be employed by a component or system to generate a sub-collection of media items for use in implementing a scan function described supra.

Figure 12:
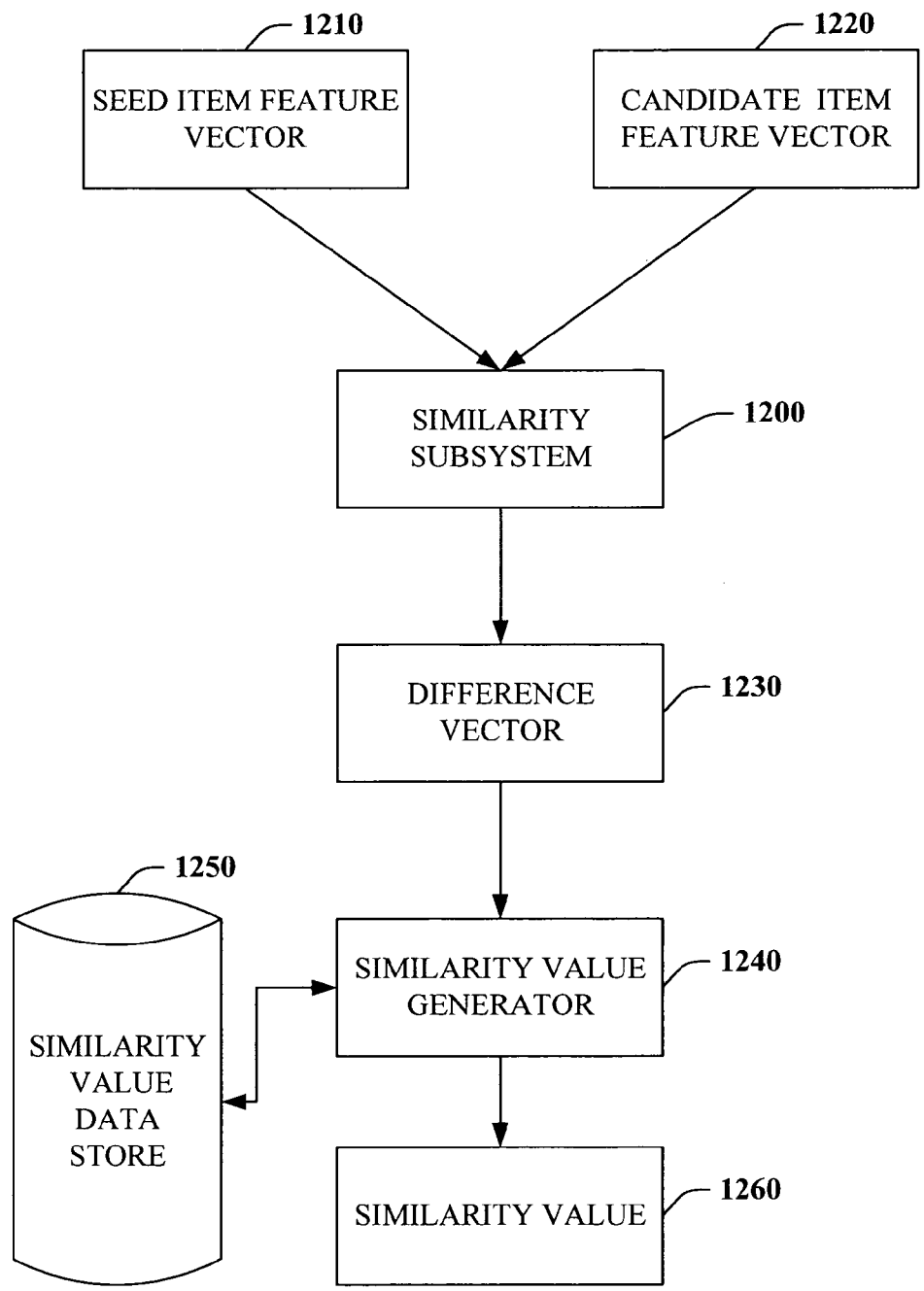
FIG. 12 is a block diagram of a system that generates a final similarity value in accordance with the present invention.

Turning now to FIG. 12, a block diagram of a similarity subsystem 1200 and a similarity value generator 1240 employed in computing a similarity value 1260 is depicted. The similarity subsystem 1200 accepts as inputs a seed item feature vector 1210 and a candidate item feature vector 1220. While FIG. 12 refers primarily to feature vectors and feature vector similarity processing, it is to be appreciated that other similarity analysis techniques may be employed in accordance with the present invention. In one example of the present invention, the seed item feature vector 1210 includes fields encoding information relating to genre, subgenre, genre, style, mood, vocal coding, rhythm type and rhythm description. Similarly, the candidate item feature vector 1220 also includes fields encoding information relating to genre, subgenre, genre, style, mood, vocal coding, rhythm type and rhythm description. Thus, the similarity subsystem 1200 can compare the feature vectors using suitable techniques (e.g., attribute-wise comparison) to produce a difference vector 1230. For example, if the seed item feature vector 1210 and the candidate item feature vector 1220 both code information relating to seven attributes, the difference vector 1230 would indicate differences and/or similarities among the seven attributes (e.g., a seven bit or seven attribute vector). The difference vector 1230 is then employed as an input to a similarity value generator 1240 that can employ the difference vector 1230 as an index into a similarity value data store 1250 to produce the similarity value 1260. The similarity value data store 1250 can store, for example, a lookup table that can be employed to translate the difference vector 1230 into the similarity value 1260. In one example of the present invention, the similarity value data store 1250 contains correlation values that were generated by machine learning techniques applied to similarity processing involving difference vectors generated from seed item feature vectors and candidate item feature vectors. One example of a number of similarity values and corresponding difference vectors are depicted below in Table II. The order of the features in the difference vector in Table II is, from left to right, mood, rhythm description, rhythm type, vocal coding, style, subgenre, and genre.

TABLE II

| | | | | | | | |
|---|---|---|---|---|---|---|---|
| 1.00000 | 1111111 | 0.65718 | 1101111 | 0.48806 | 1211111 | 0.46408 | 0111111 |
| 0.42899 | 1201111 | 0.38207 | 0101111 | 0.28465 | 1110111 | 0.27998 | 0011111 |
| 0.27839 | 0001111 | 0.22812 | 1100111 | 0.18447 | 1210111 | 0.18411 | 1200111 |
| 0.17514 | 0110111 | 0.14698 | 0100111 | 0.11046 | 0010111 | 0.11046 | 0000111 |
| 0.08364 | 1111011 | 0.07779 | 1101011 | 0.06834 | 0111011 | 0.06624 | 1211011 |
| 0.06434 | 0101011 | 0.06323 | 1201011 | 0.05369 | 0011011 | 0.05210 | 0001011 |
| 0.04052 | 1110011 | 0.03795 | 1100011 | 0.03272 | 0110011 | 0.03120 | 1210011 |
| 0.03084 | 1200011 | 0.03072 | 0100011 | 0.02814 | 1111001 | 0.02407 | 0010011 |
| 0.02407 | 0000011 | 0.02229 | 1101001 | 0.01826 | 0111001 | 0.01676 | 1211001 |
| 0.01425 | 0101001 | 0.01375 | 1201001 | 0.00962 | 0011001 | 0.00874 | 1110001 |
| 0.00803 | 0001001 | 0.00634 | 0110001 | 0.00616 | 1100001 | 0.00508 | 1210001 |
| 0.00472 | 1200001 | 0.00435 | 0100001 | 0.00419 | 1111000 | 0.00337 | 0010001 |
| 0.00337 | 0000001 | 0.00233 | 1211000 | 0.00216 | 1101000 | 0.00215 | 0111000 |
| 0.00140 | 1201000 | 0.00125 | 0101000 | 0.00124 | 1110000 | 0.00086 | 0011000 |
| 0.00065 | 0001000 | 0.00058 | 0110000 | 0.00057 | 1210000 | 0.00053 | 1100000 |
| 0.00036 | 1200000 | 0.00031 | 0100000 | 0.00029 | 0010000 | 0.00029 | 0000000 |

In Table II, the similarity values fall within the range 0 to 1.0. Examining a first entry, 1.00000 1111111, the difference vector 1111111 indicates that the seed item feature vector 1210 matched the candidate item feature vector 1220 in each attribute, thus, each bit of the difference vector was set to one, and the corresponding similarity value 1.00000 indicates a high degree of similarity between the two items. Examining a second entry, 0.06834 0111011, the difference vector 0111011 indicates that the seed item feature vector 1210 matched the candidate item feature vector 1220 in five attributes (rhythm description, rhythm type, vocal code, subgenre, and genre), and that the corresponding similarity value is 0.06834. Similarly, a third entry 0.04052 1110011 also indicates that the seed item feature vector 1210 matched the candidate item feature vector 1220 in five attributes (mood, rhythm description, rhythm type, subgenre and genre), and that the corresponding similarity value is 0.04052. Thus, the machine learning that was applied to the feature vectors and/or difference vectors determined that the combination of five matched attributes coded in the difference vector 0111011 should result in a higher similarity value than the five matched attributes coded in the difference vector 1110011. While one table of difference vectors and similarity values are described in connection with FIG. 12, it is to be appreciated that other such tables may be employed in accordance with the present invention, where such tables are hand coded, machine coded and/or the result of machine learning algorithms. It is to be further appreciated that although difference vectors and feature vectors with seven attributes are discussed in connection with FIG. 12, that difference vectors and/or feature vectors with a greater or lesser number of attributes, and/or with different attributes can be employed in accordance with aspects of the present invention.

For illustrative purposes only, the system in FIG. 12 is illustrated as operating on a single seed item; however, the system 1200 can employ multiple seed items by generating multiple similarity scores and then combining the multiple similarity scores into one similarity score. For example, the similarity score between every seed item and a candidate item can be averaged together to yield a single similarity score that would be utilized by a playlist generator 404 as described it FIG. 4 or a playlist generating system 1020 as described in FIG. 10. Additionally, as described with respect to FIG. 12, the similarity value 1260 can be employed to generate an overall or final similarity value as is described in FIG. 11. It is to be appreciated that other techniques, such as weighted average, or median, can also be employed.

Tables such as table I can be generated using the following machine learning algorithm. Let $K_{ij}$ be defined by a training set of albums (or playlists) such that $$K_{ij} = \sum_n f_n(s_i) f_n(s_j) \qquad (3)$$

where $f_n(s_i)$ is defined to be 1 when song $s_i$ appears on the nth album (or playlist), 0 otherwise. It is to be appreciated that the matrix $K_{ij}$ is sparse, and hence can be stored and manipulated as a sparse matrix. The weights in the lookup table can be computed by first solving the sparse quadratic program $$\arg\min_\alpha \left(K_{ij} - \sum_k \alpha_k \psi_k(s_i, s_j)\right)^2 \qquad (4)$$

subject to the constraints that all $\alpha_k$ are non-negative. The $\alpha_k$ become a second layer of trainable weights, and the $\psi_k$ are the first-layer of fixed basis functions, defined to be 1 if $A_{kl}$ is 0 or $x_{il}$ has the same value as $x_{jl}$ for all l, where $A_{kl}$ is further defined to be the lth bit of the binary representation of the number k, and where $x_{il}$ is the lth metadata feature of the song $s_i$. In the case of the metadata feature vectors described above, l will range from 1 to 7 and k will range from 0 to 127, although other metadata feature vectors and other ranges are possible. Solving sparse quadratic programs is known in the art. The two-layer system can be represented in a lookup table, such as that shown in Table 1, by computing $L_m$ (the mth lookup table entry) via $$L_m = \sum_k \alpha_k g_{km} \qquad (5)$$

where $g_{km}$ is defined to be 1 if $A_{kl}$ is zero or $A_{ml}$ is 1 for all l, and 0 otherwise. It is to be appreciated that other machine learning algorithms can be used to generate such lookup tables, or the lookup table can be hand-designed.

In view of the exemplary systems shown and described above, methodologies that may be implemented in accordance with the present invention, will be better appreciated with reference to the flow charts of FIGS. 13-20. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 13:
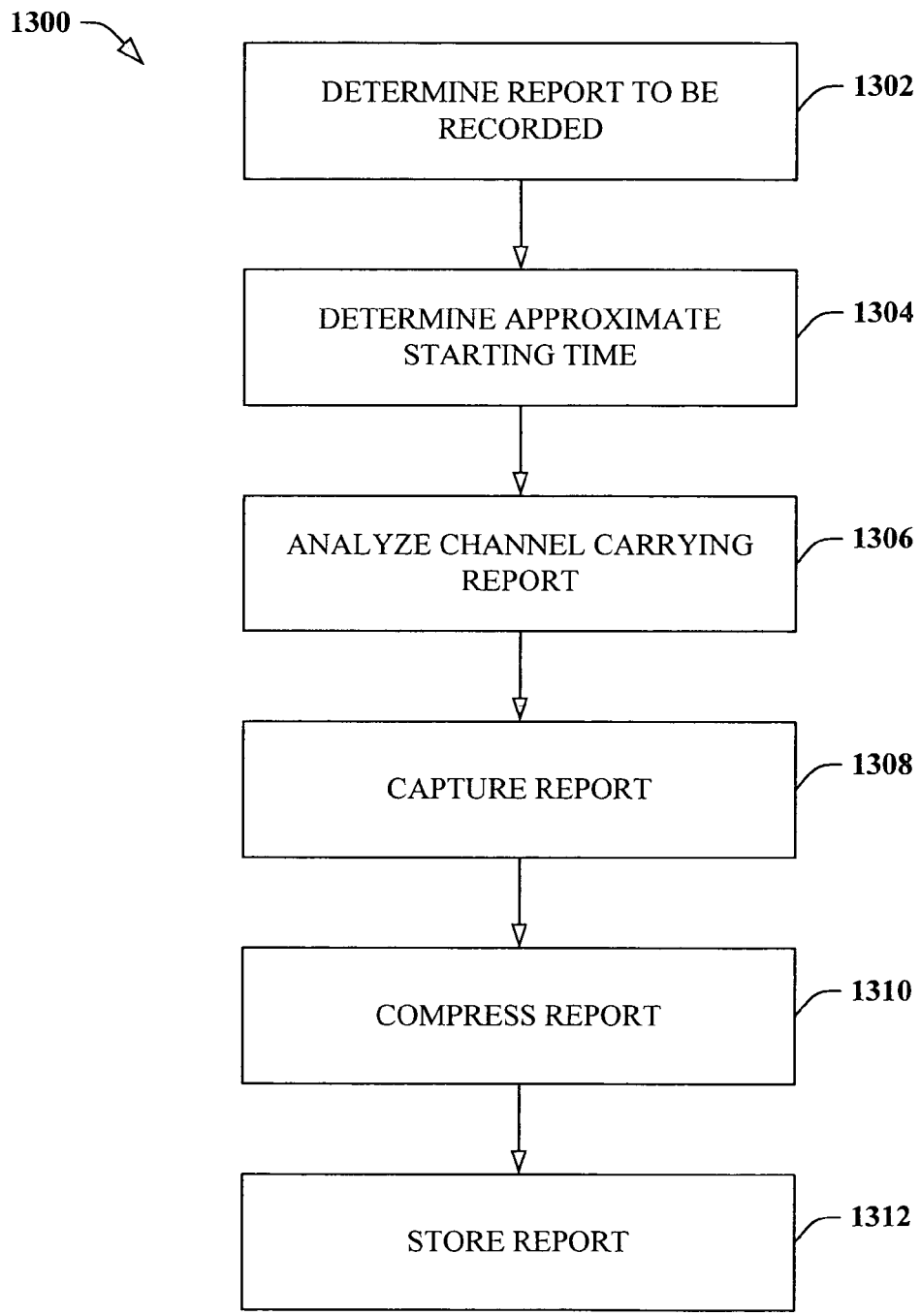
FIG. 13 is a flow diagram of a method that facilitates recording information content in accordance with the present invention.

FIG. 13 is a flow diagram depicting a method 1300 that facilitates recording information content in accordance with an aspect of the present invention. The method 1300 can record and maintain current information content (e.g., information reports: news, weather and traffic). The method 1300 can mitigate user(s) from missing important and/or desired information.

Beginning at 1302, an information report to be recorded is determined. The information report is typically a report for content such as news, weather, traffic, sports and the like. A mechanism, such as a user interface, can be employed to indicate the information report to be recorded. Alternately, various types of reports are continuously identified and/or determined and recorded. An approximate starting time of the report is determined at 1304. In some aspects, the approximate time can be entered by a user. Alternately, a table of scheduling information (e.g., electronic program guide) can be employed to determine the approximate starting time. The approximate time should be an amount of time before an expected starting time so as to ensure that the start of the report is captured. The report is generated or broadcast via a particular station or channel (e.g., FM channel, AM channel, satellite channel, network address, and the like). Thus, a channel that carries or plays the information report is analyzed at 1306. Generally, the analyzing of the channel begins at the approximate starting time. The channel is analyzed to identify signature jingles that indicate a start of a report or broadcast (e.g., news update, traffic report, weather report, . . . ). If the starting time of the report is known with precision, then step 1306 may be omitted, in order to save computation. Then, the report is captured or recorded at 1308 in a predetermined format. The end of the report is identified by continuing to analyze the report for a closing jingle or signature. Again, if the ending time of the report is known with precision, then no analysis is necessary. Alternately, the end of the report can be a fixed amount of time. Subsequent to recording the report, the report is converted to a compressed format at 1310. It is appreciated that alternate aspects can record the report to a compressed format at 1308. Finally, at 1312, the compressed report is stored for later retrieval. The compressed report can be stored with identifying indicia and a time stamp. The time stamp facilitates determination of whether to discard a recorded report or not.

It is appreciated that a user can select one or more reports to be broadcasts (e.g., news report, weather report, traffic report and the like). The user can enter approximate or expected starting times. Additionally, the user can facilitate operation of the method 1300 by training an appropriate jingle or signature for a particular report. Furthermore, previous recording(s) of the report can be discarded in order to conserve storage space.

Figure 14:
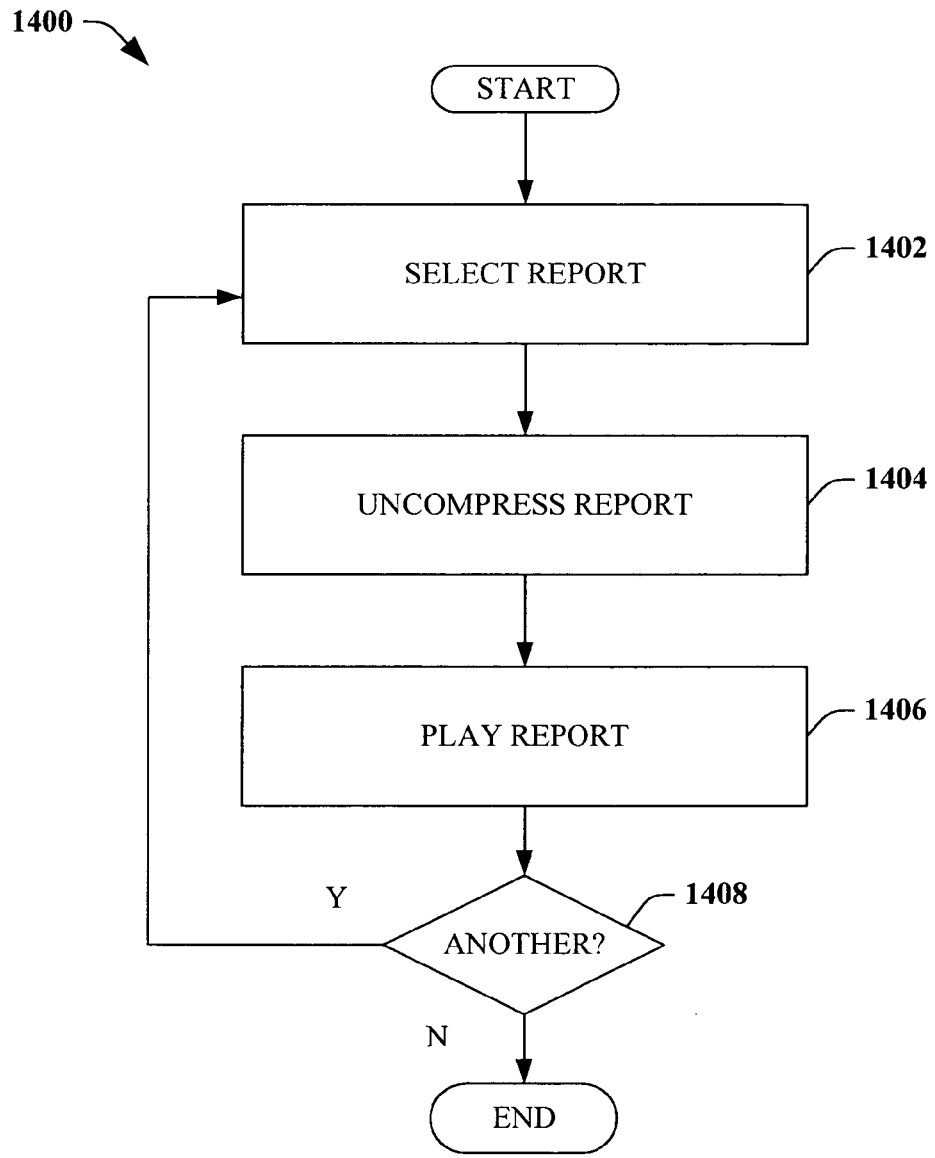
FIG. 14 is a flow diagram of a method that facilitates playing information content in accordance with the present invention.

Turning now to FIG. 14, a flow diagram of a method 1400 that facilitates playing of information content in accordance with an aspect of the present invention is illustrated. The method 1400 permits a user to access or play current information content (e.g., news, traffic, weather, sports, and the like).

A desired report is selected at 1402. The desired report (e.g., current news, weather or traffic report) has previously been recorded by a method such as described supra in FIG. 13. The desired report is typically selected by means of a user interface wherein a user selects a button therein selecting the desired report. The user interface can permit a variety of selectable reports. A suitable user interface that can be employed with the method 1400 is depicted in FIG. 2. Other suitable means can be employed to select or determine the desired report and still be in accordance with the present invention. Further, a storage device is generally employed to store and maintain the desired report along with a number of other reports, in a suitable compressed format.

The desired report is uncompressed at 1404 utilizing a suitable decompression format. It is appreciated that alternate aspects can forego uncompressing the report and simply provide compressed versions of the report. Such aspects are advantageous for devices that are operative to play compressed formats. Subsequent to uncompressing the report, the uncompressed report is provided in a suitable format at 1406 (e.g., digital, analog). It is appreciated that other types of signal processing such as, digital to analog conversion, filtering and the like can be performed on the report. The report can be provided to a sound system or other audio playing device (e.g., home stereo, car radio, portable digital audio player, personal digital assistant, communicator, cellular phone and the like). After the report is provided, the method 1400 returns to 1402 where another desired report can be selected if so desired by the user at 1408. Alternatively, a user can interrupt the playing of the report at step 1406 by selecting another report. In this case, the playing of the previous report would stop and the playing of the newly selected report would begin. Similarly, a user can interrupt the playing of entertainment items by selecting a report at step 1402, or the user can interrupt the playing of the report at 1406 by initiating the scan function of FIG. 15.

Figure 15:
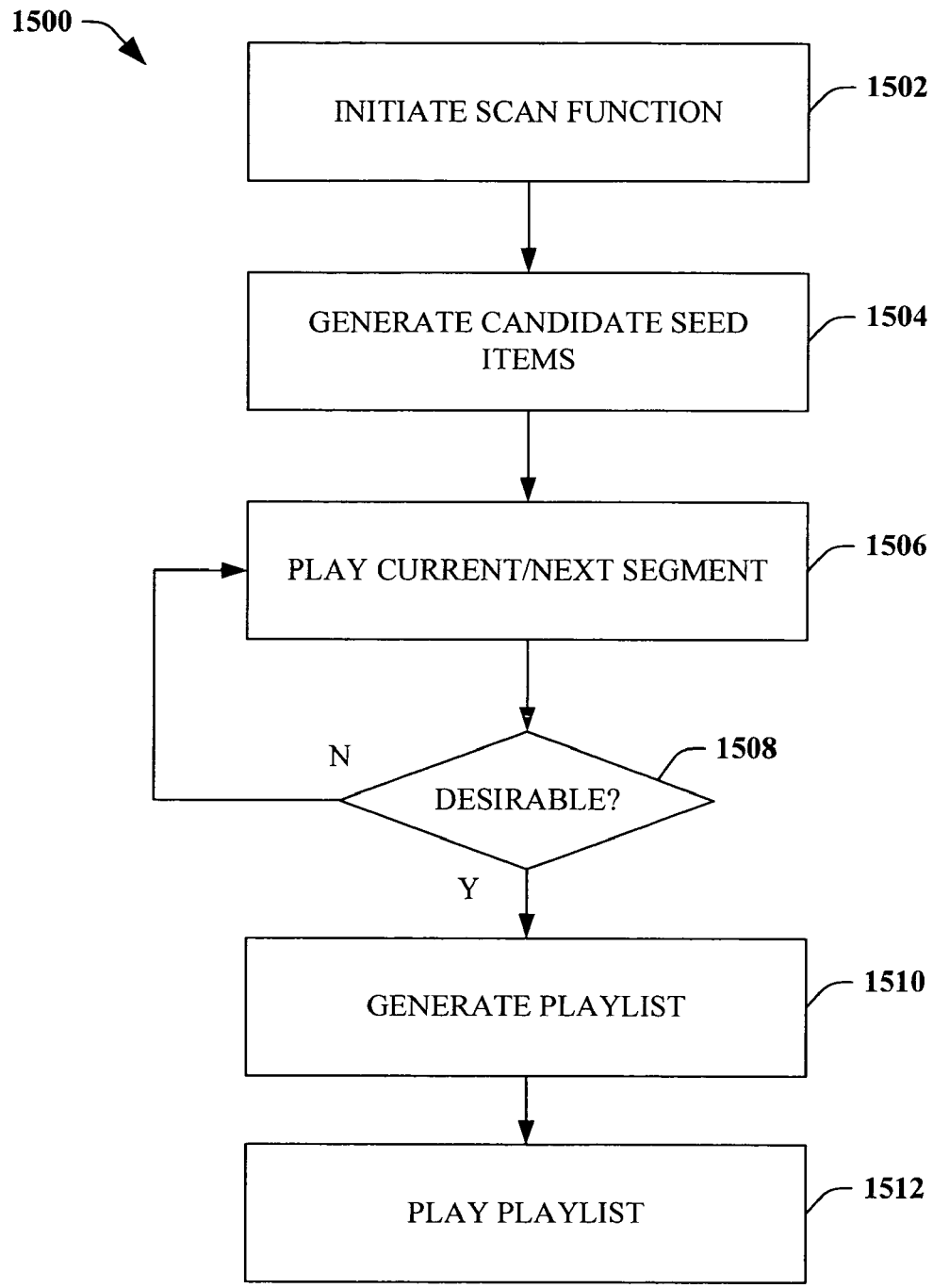
FIG. 15 is a flow diagram of a method that facilitates utilizing entertainment content in accordance with the present invention.

FIG. 15 is a flow diagram that illustrates a method 1500 that facilitates utilizing entertainment content in accordance with an aspect of the present invention. The method 1500 detects user preferences and plays content (e.g., songs) that match the user's preferences.

A scan function is initiated at 1502. The scan function is a request for playing segments in order to obtain a user's desired characteristics (e.g., music preferences) and to generate a playlist and/or play media items (e.g., songs) that match those preferences. Typically, the scan function is initiated via a user interface by a user. A collection of candidate seed items are generated at 1504. The collection is a portion of a media collection and is typically at least partially randomly determined and is generated such that successive candidate seed items in the list are substantially dissimilar (e.g., not alike). A current segment, which is a small portion of a respective candidate seed item, is played at 1506. Then, the current segment, and thereby the associated candidate seed item, is selected as either desirable or undesirable at 1508. Generally, the segment is deemed undesirable by failure of a user to indicate (e.g., by pressing a scan button during playing a segment) desirability of that segment. If the segment is selected as undesirable, the method continues at 1506 with a new current segment.

If the segment is selected as desirable at 1508, the method 1500 continues at 1510 where a playlist is generated from the desirable and undesirable seed item(s). Finally, the remaining portion of the current segment along with the generated playlist are played at 1512. The playlist at step 1512 can be interrupted by the user initiating a new scan function at step 1502, which would cause the playlist to cease playing and the segments to start playing at step 1506. Alternatively, the playlist at step 1512 can also be interrupted by a user selecting a report at step 1402 of FIG. 14. Again, this would cause the playlist to cease playing.

Figure 16:
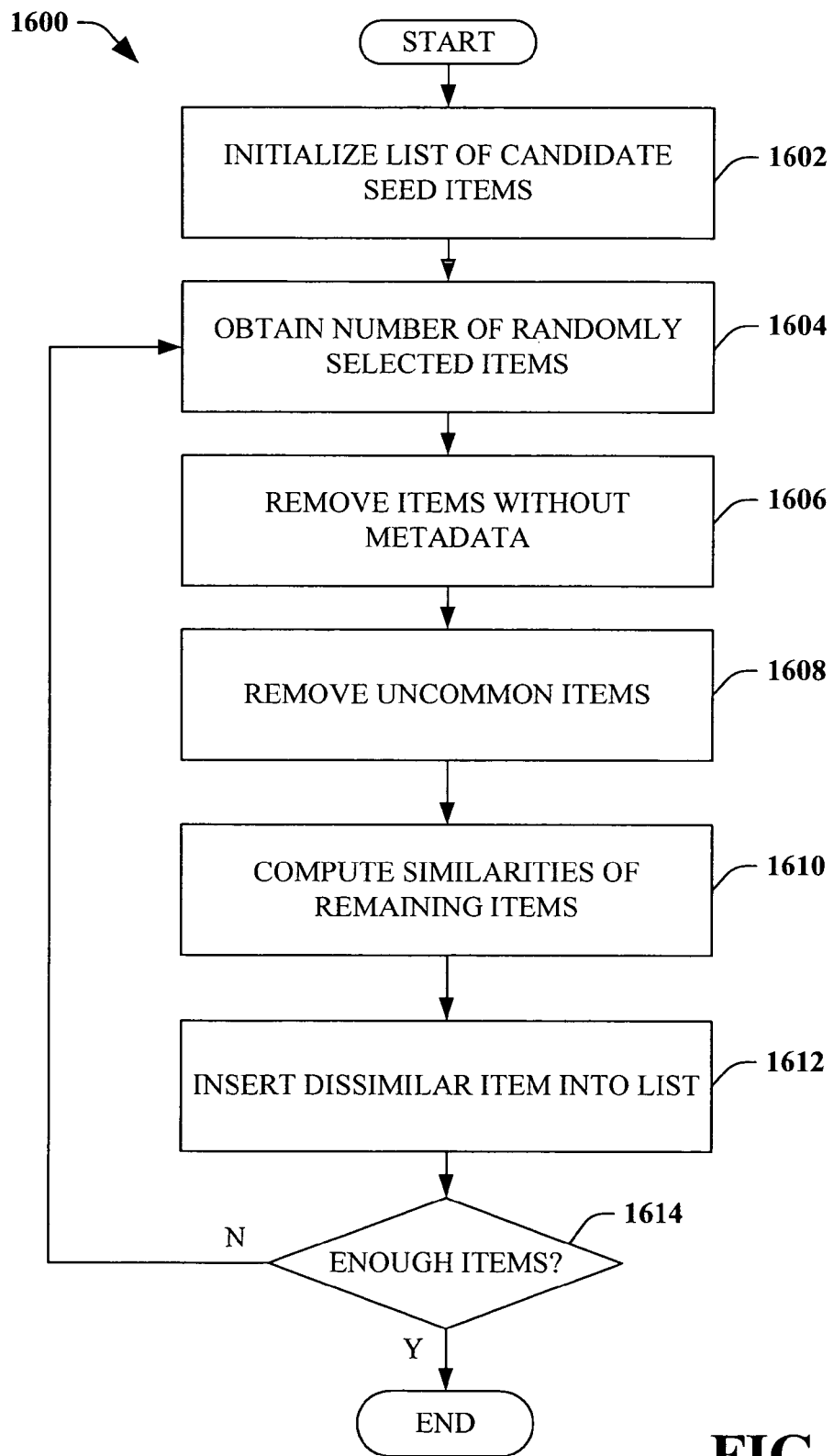
FIG. 16 is a flow diagram of a method that facilitates generation of a list of candidate seed items in accordance with the present invention.

Turning now to FIG. 16, a flow diagram of a method 1600 that facilitates generation of a list of candidate seed items in accordance with an aspect of the present invention is illustrated. The method 1600 can be incorporated with method 1500 of FIG. 15 to further facilitate utilizing entertainment content.

The method 1600 begins at 1602 where a list of candidate seed items is initialized. A selected number of randomly selected items are obtained from a media collection at 1604. A typical number that can be employed is 20 randomly selected items. Media items without metadata are removed from the randomly selected items at 1606. Without metadata that indicates characteristics of a media item, it is difficult to identify media items similar to an item without metadata. However, it is appreciated that alternate aspects of the invention can analyze such items and approximate similarities for such item(s). Additionally, uncommon media items are removed from the randomly selected items at 1608. An example of an uncommon media item would be a song whose subgenre does not match many other song subgenres in the media database 112. Subsequently, similarities (e.g., K(media item$_1$, media item$_2$) K(media item$_1$, media item$_3$) ... ) are computed at 1610 between the remaining randomly selected items (e.g., those having metadata and being somewhat common) and the list of candidate seed items. Next, one of the randomly selected items is inserted into the list at 1612 as a candidate seed item. The inserted item is most dissimilar to some or all of the previously inserted candidate seed item(s). It is appreciated that the first item inserted into the list is merely randomly selected. The method 1600 then decides at 1614 whether enough items are in the list of candidate seed items and continues at 1604 with additional randomly selected items, iteratively, until the list of candidate items includes a suitable number of items.

Subsequently, segments for the list of candidate seed items can be played for a user in order to determine desired characteristics for the user. The segments can be particular portions of media items (e.g., as identified in a database) or at a certain period of time in the candidate items.

Figure 17:
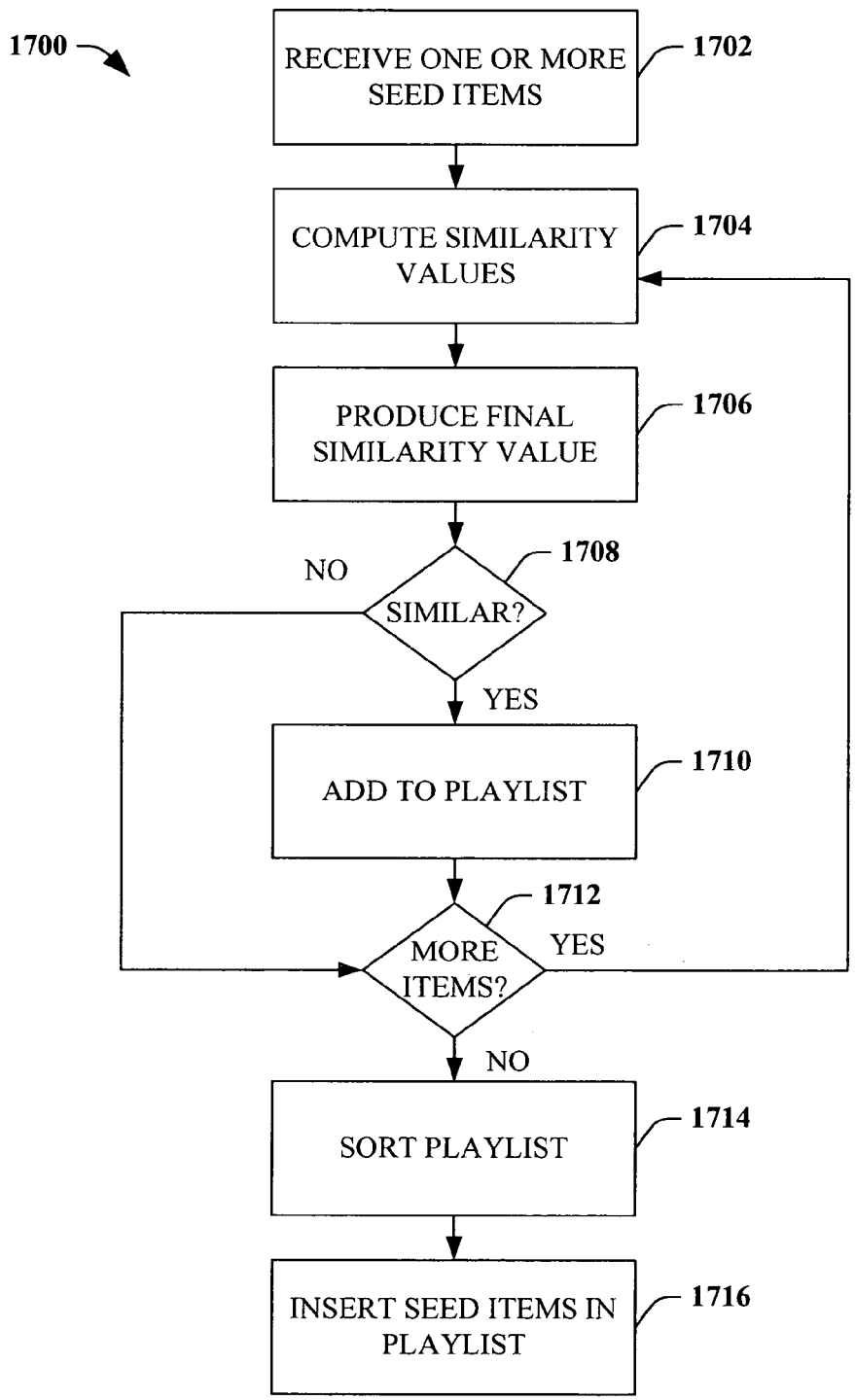
FIG. 17 is a flow diagram of a method for generating a playlist in accordance with the present invention.

Turning now to FIG. 17, a flow diagram of a method 1700 of generating a playlist in accordance with an aspect of the present invention is depicted. The method 1700 receives one or more seed items and generates a playlist there from for a library or collection of media items. The media items are types of digital media such as, but not limited to, songs or music, videos, electronic books, documents, images and the like. The seed items are typically members of the library or collection of media items. The method 1700 can be invoked for a set number of seed items and/or can be (re)invoked on one or more new seed items being received.

Beginning at 1702, the method 1700 receives one or more seed items. The one or more seed items are members of the library or collection of media items. The one or more seed items can be obtained by means and methods described above, but are omitted here for brevity. Similarity values are then computed for the respective seed items by comparing the seed items, individually, to a candidate item at 1704. Generally, a similarity value for each seed item is computed for the respective media items, also referred to as candidate items. The similarity values are weighted and added together to produce a final similarity value at 1706. The weights for the individual similarity values can be obtained via a variety of suitable approaches. One approach is to assign the respective weights for the similarity values as +1. This approach results in the similarity value that is an average of the respective similarity values. Another approach is to assign the respective weights as +1 for indicating that a seed item is desirable (e.g., by selecting a scan button as described in FIG. 2) and as −1 for indicating that a seed item is undesirable (e.g., by not selecting a scan button as described in FIG. 2). This approach produces the final similarity value that is a function of desirable and undesirable seed items. Yet another approach is to assign the respective weights by selected values from a range (e.g., +1 to −1). The respected weights can be selected or input by a user (e.g., by a user selecting a weight for an added or removed item). Thus, larger weights (in absolute value terms) have more of an effect on the final similarity value than smaller weights.

However, it is possible that one or more of the seed item(s) are also candidate items. Thus, the weights are computed such that if the candidate item is the same as one of the desirable seed items (e.g., added), the resulting similarity is exactly 1 while if the candidate item is the same as one of the undesirable seed items (e.g., removed), the resulting similarity is exactly 0. Alternatively, if the user has expressed a non-binary target preference (between 0 and 1), then the resulting similarity should match the target preference.

The method 1700 continues at 1708, where media items of the collection are added to a playlist (e.g., their path and/or filename) at 1710 if their final similarity value with respect to the one or more seed items exceeds a minimum threshold. For example, for an implementation having 7 attributes (e.g., from meta data), a media item could be required to have a final similarity value equal or greater than 0.714 which indicates that the media item has about 5 of 7 attributes in common with the one or more seed items. It is appreciated that factors such as weights and undesirable characteristics can modify the number of attributes a media item has in common with the respective seed items while still providing a suitable final similarity value. If there are additional items in the collection at 1712, the method 1700 continues with a next item at 1704. Otherwise, if there are no more items in the collection at 1712, the method 1700 continues at 1714 where the items or tracks in the playlist are sorted according to their respective final similarity values. Thus, items that are more similar are played or encountered prior to less similar items. This is generally desirable because, for example, a user would likely prefer to hear the more similar songs first. Additionally, the desirable seed items, by virtue of necessarily being more similar, are inserted at the beginning of the playlist at 1716.

The playlist can then be utilized by a device or component to, for example, play audio songs (e.g., for digital music), play a slide shows (e.g., for images), music videos and the like according to the playlists. Additionally, as discussed above, the generated playlist can be modified by adding or removing seed items and then employing the method to regenerate the playlist including the new items.

Figure 18:
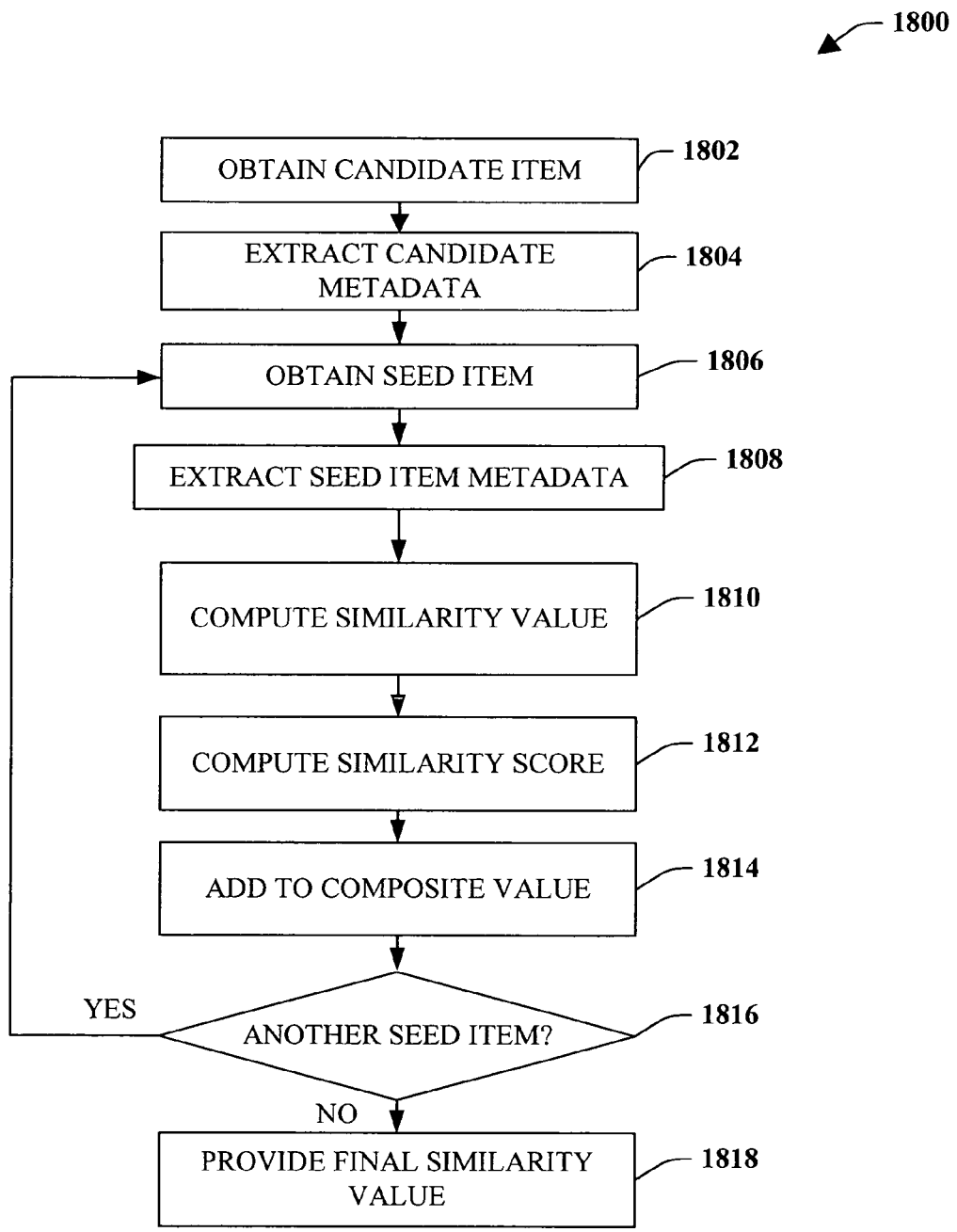
FIG. 18 is a flow diagram of a method for computing a similarity value in accordance with the present invention.

Referring now to FIG. 18, a method 1800 of computing a final similarity value for one or more seed items and a candidate item in accordance with an aspect of the present invention is disclosed. For illustrative purposes only, the method 1800 is discussed with respect to a candidate item, but it is appreciated that the method 1800 can be employed with any suitable number of candidate items that might comprise a library or collection of media items.

A candidate item is obtained at 1802, the candidate item being a member of a library or collection of media items. Candidate item metadata is obtained from the candidate item at 1804. The media items can include types of media such as, but not limited to, music, video, images and the like. A seed item is obtained at 1806 that represents desired or undesired characteristics. Seed item metadata is then obtained or extracted from the seed item at 1808. The metadata can be obtained by the metadata being part of the seed item and/or candidate item (e.g., a tag in a file) or can be obtained from analyzing the items themselves.

A similarity value or metric is computed according to the seed item metadata and the candidate item metadata at 1810. A variety of suitable methods of computing the similarity value are described elsewhere in this description, but omitted here for brevity. Subsequently, the similarity value is multiplied by a weighting factor at 1812. The weighting factor indicates degrees of desirability and undesirability of the seed item. For example, a weight of +1 typically is employed to indicate a strong preference for that seed item while a weight of −1 generally is utilized to indicate a strong dislike for the seed item by a user. Additionally, the weighting factor can be obtained with the seed item. After the similarity value has been computed at 1812, the similarity value is added to a composite similarity value at 1814. The composite value is essentially a running total or summation of the similarity values for one or more seed items and the single candidate items.

If another seed item is available to be processed at 1816, the method 1800 continues at 1806 with the next seed item. Otherwise, if there are no more seed items to process at 1816, the composite similarity value is utilized as the final similarity value at 1818. Additional processing can be performed on the final similarity value, such as by dividing it by the number of seed items or some other scaling to produce a unified result. Then, that final similarity value is typically employed to determine whether or not to add the candidate item to a playlist and to order or sort the playlist. Finally, the method 1800 can be invoked to process remaining items of library or collection, if present.

Figure 19:
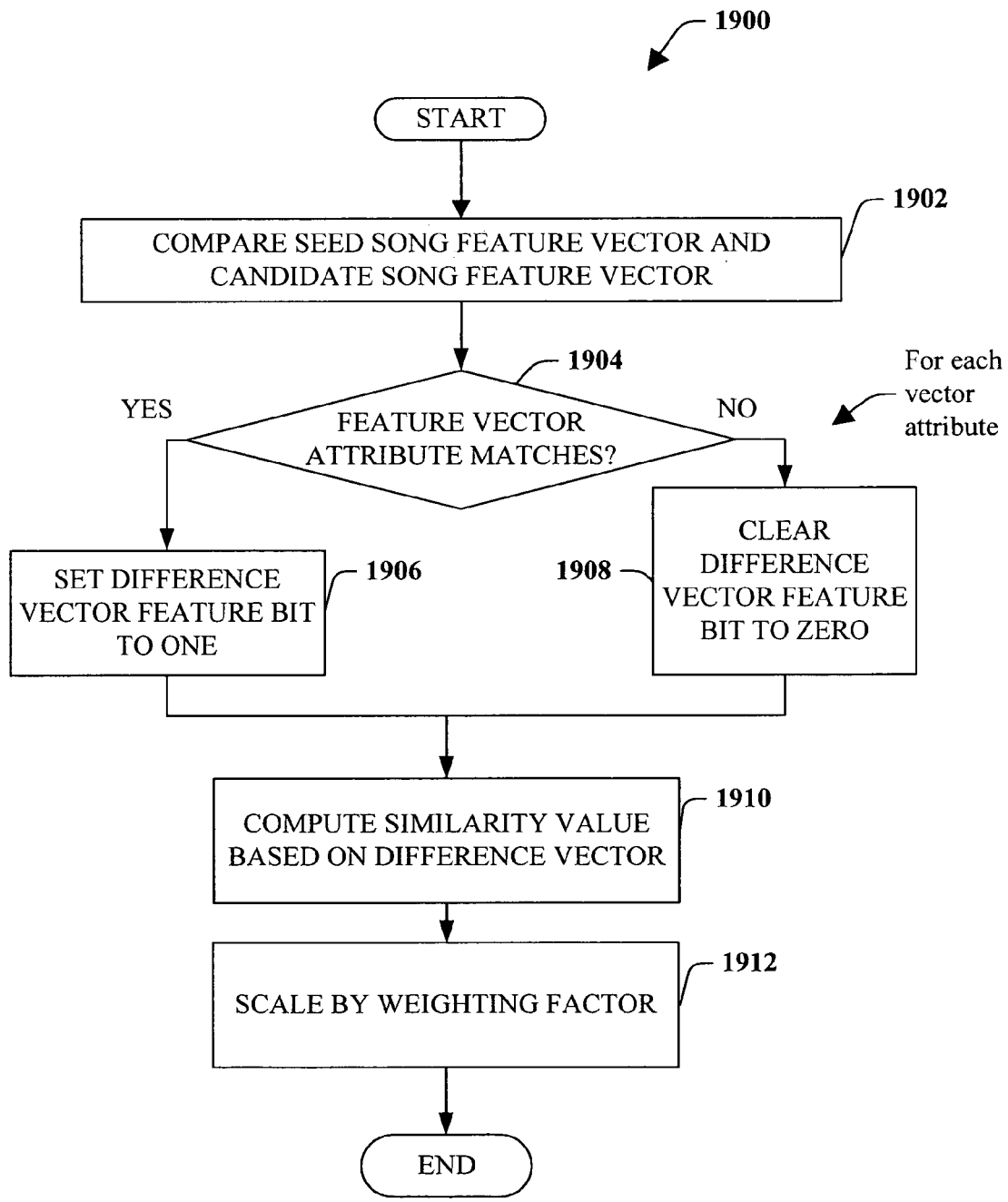
FIG. 19 is a flow diagram of a method of computing a weighted similarity value in accordance with the present invention.

FIG. 19 illustrates a method 1900 of computing a weighted similarity value based on a difference vector in accordance with an aspect of the present invention. The method 1900 operates on a media item, also referred to as a candidate item and a seed item. The method can be invoked separately for one or more seed items. At 1902, a seed item feature vector and a candidate item feature vector are compared. In one example of the present invention, the feature vectors include seven attributes, where each attribute may have one or more possible values. For example, a mood attribute can have twenty one possible values while a style attribute may have two thousand possible values. Blocks 1904, 1906 and/or 1908 can be performed for each feature attribute. Thus, at 1904, a determination is made concerning whether the seed item feature vector attributes match the candidate item feature vector attributes. If the determination at 1904 is YES, then at 1906, the bit corresponding to the compared attribute in the difference vector is set to one. If the determination at 1904 is NO, then at 1908, the bit corresponding to the compared attribute in the difference vector is cleared to zero. Thus, a difference vector that contains one binary digit for each attribute compared between the seed song feature vector and the candidate song feature vector is created.

At 1910, a similarity value can then be computed based on the difference vector. By way of illustration and not limitation, a function that accepts as an input a difference vector and produces as an output a similarity value can be employed to produce the similarity value. By way of further illustration and not limitation, a value may be retrieved from a database table by employing the difference vector as an index into the database table. While a similarity value function and a similarity value lookup are described above, it is to be appreciated that other methods for producing a similarity value from a difference vector may be employed in accordance with the present invention (e.g., treat the difference vector as a binary number corresponding to the similarity value). Then, at 1912, the similarity value is multiplied by a weighting factor. The weighting factor is generally of a range of values, such as +1 to −1 and indicates a degree of desirability or undesirability that a user has for a particular seed item.

It is appreciated that the methods described supra, are readily combinable with each other and variations thereof. Furthermore, the methods can also be employed with the systems described supra.

Figure 20:
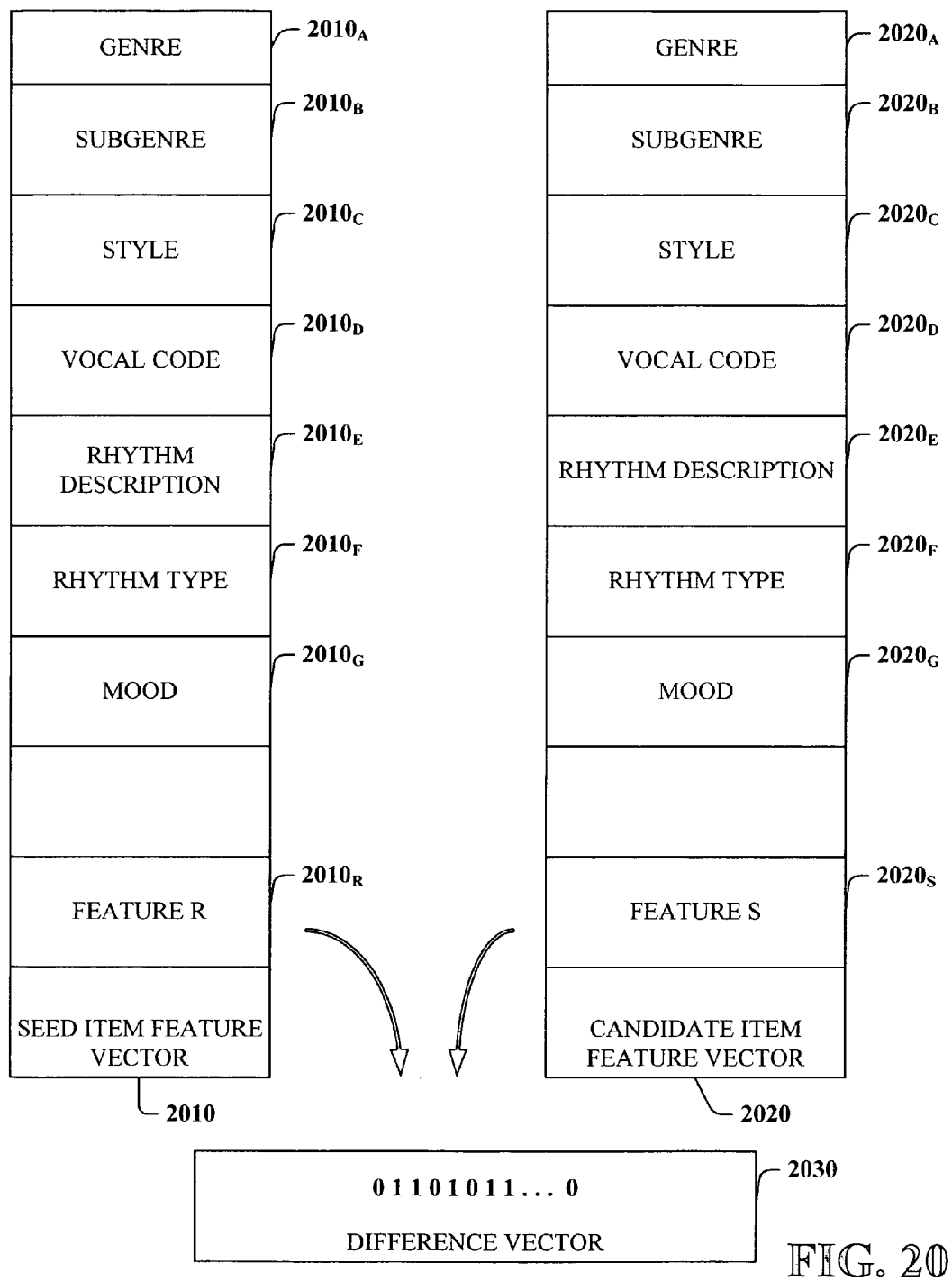
FIG. 20 is a block diagram illustrating generation of a difference vector in accordance with the present invention.

Turning now to FIG. 20, a schematic block diagram illustrating feature vectors being compared to produce a difference vector 2030 is depicted. A first feature vector 2010 may include one or more feature attributes (e.g., attributes 2010$_A$ through 2010$_R$, A and R being integers). For example the first feature vector 2010 may include a genre attribute 2010$_A$ and a subgenre attribute 2010$_B$ that can be employed to facilitate characterizing a song. Similarly, a second feature vector 2020 may include one or more feature attributes (e.g., attributes 2020$_A$ through 2020$_S$, S being an integer). For example the second feature vector 2020 may include a genre attribute 2020$_A$ and a subgenre attribute 2020$_B$ (B being an integer) that can be employed to facilitate characterizing a song. The feature vectors may be compared attribute by attribute to produce a difference vector 2030 that contains a binary digit that codes information concerning whether the feature attributes matched. Such attribute by attribute comparison may be complicated by a situation where the feature vectors contain different attributes and/or a different number of attributes. For example, the first feature vector 2010 might contain a first number R of feature attributes while the second feature vector 2020 might contain a second number S of feature attributes. Thus, one or more bits in the difference vector 2030 may code information based on a comparison of feature attributes that do not have a one to one correspondence. By way of illustration, the first feature vector 2010 may code information concerning song length into two attributes (e.g., length of song in seconds, size of song in kilobytes) while the second feature vector 2020 may code information concerning song length into one attribute (e.g., play length). Thus, setting or clearing a bit in the difference vector 2030 may involve resolving the dissimilar feature vector attributes. More specifically, if a subset of feature vectors is missing at random, the difference vector for the missing data can be set to be "1", indicating a difference.

Figure 21:
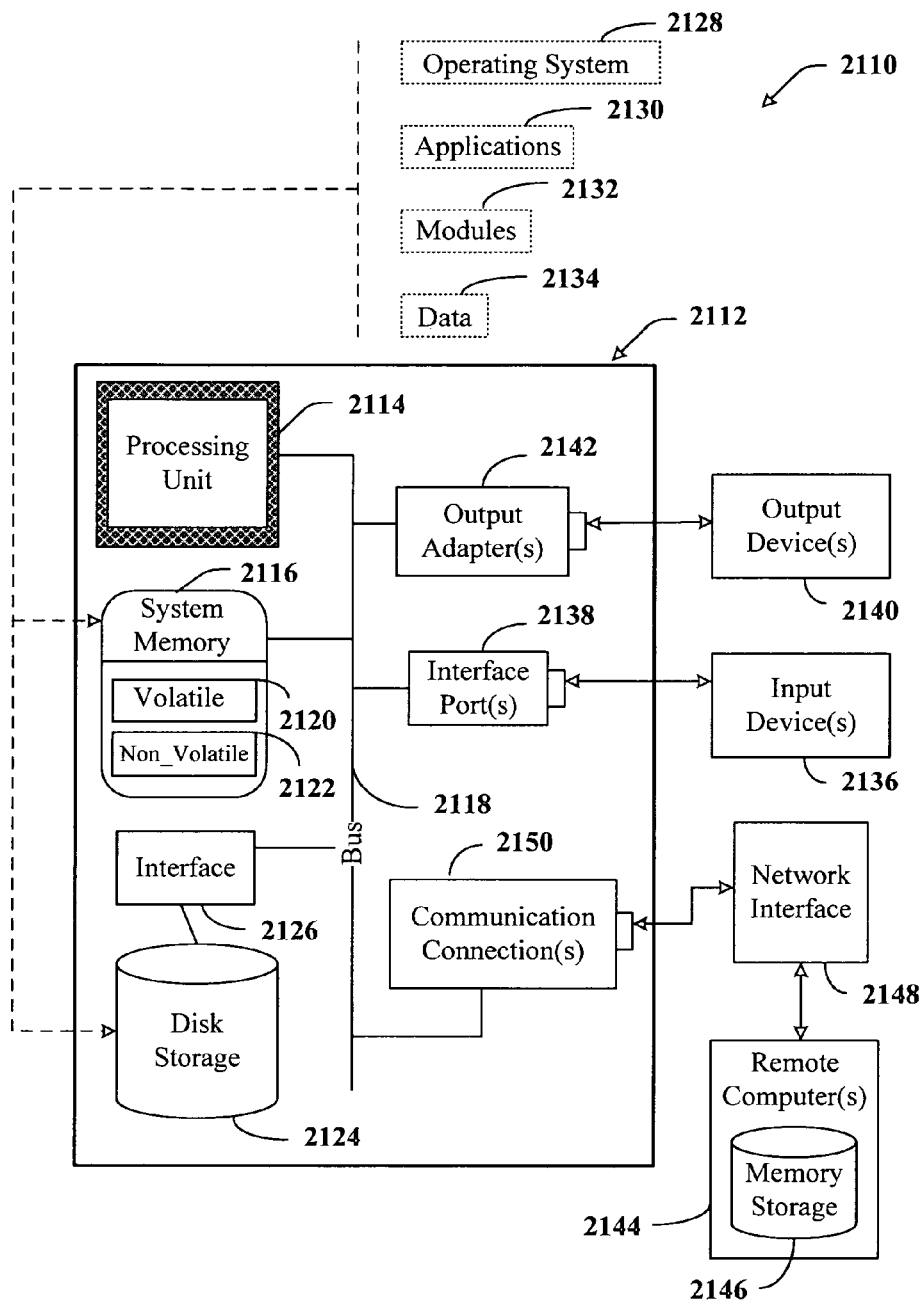
FIG. 21 is a schematic block diagram of an exemplary operating environment for a system configured in accordance with the present invention.

In order to provide additional context for various aspects of the present invention, FIG. 21 and the following discussion are intended to provide a brief, general description of a suitable operating environment 2110 in which various aspects of the present invention may be implemented. FIG. 21 provides an additional and/or alternative operating environment in which the present invention can operate. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 2110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 21, an exemplary environment 2110 for implementing various aspects of the invention includes a computer 2112. The computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Dual microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 21-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable ROM (EEPROM), or flash memory. Volatile memory 2120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/nonremovable, volatile/nonvolatile computer storage media. FIG. 21 illustrates, for example a disk storage 2124. Disk storage 2124 includes, but is not limited to, devices like a magnetic disk drive, floppy disk drive, tape drive, Jazz drive, Zip drive, LS-100 drive, flash memory card, or memory stick. In addition, disk storage 2124 can include storage media separately or in combination with other storage media including but not limited to an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. The operating system 2128, which can be stored on disk storage 2124, acts to control and allocate resources of the computer system 2112. System applications 2130 take advantage of the management of resources by the operating system 2128 through program modules 2132 and program data 2134 stored either in system memory 2116 or on disk storage 2124. It is to be appreciated that the present invention can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to output information from computer 2112 to an output device 2140. Output adapter 2142 is provided to illustrate that there are some output devices 2140 like monitors, speakers, and printers among other output devices 2140 that require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer 2144. The remote computer 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2146 is illustrated with remote computer 2144. Remote computer 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (FDDI), Copper Distributed Data Interface (CDDI), Ethernet/IEEE 2102.3, Token Ring/IEEE 2102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refers to the hardware/software employed to connect the network interface 2148 to the bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

Figure 22:
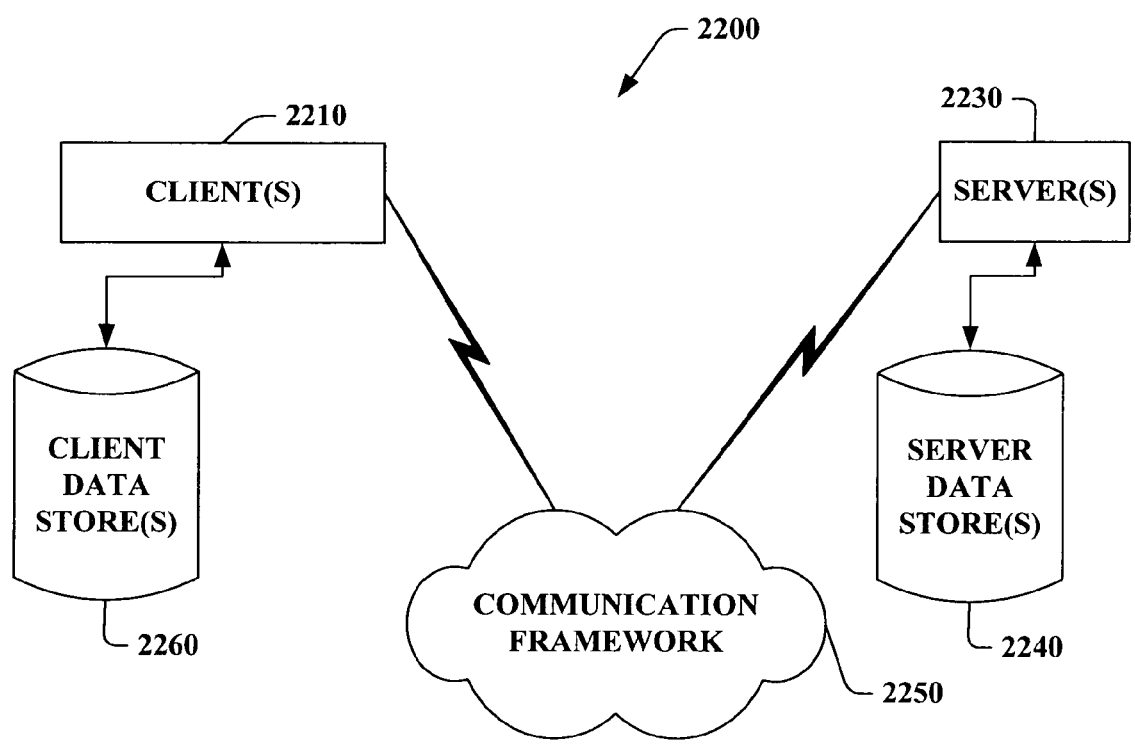
FIG. 22 is a schematic block diagram of a sample-computing environment with which the present invention can interact.

FIG. 22 is a schematic block diagram of a sample computing environment 2200 with which the present invention can interact. The system 2200 includes one or more client(s) 2210. The client(s) 2210 can be hardware and/or software (e.g., threads, processes, computing devices). The system 2200 also includes one or more server(s) 2230. The server(s) 2230 can also be hardware and/or software (e.g., threads, processes, computing devices). The servers 2230 can house threads to perform transformations by employing the present invention, for example. One possible communication between a client 2210 and a server 2230 may be in the form of a data packet adapted to be transmitted between two or more computer processes. The system 2200 includes a communication framework 2250 that can be employed to facilitate communications between the client(s) 2210 and the server(s) 2230. The client(s) 2210 are operably connected to one or more client data store(s) 2260 that can be employed to store information local to the client(s) 2210. Similarly, the server(s) 2230 are operably connected to one or more server data store(s) 2240 that can be employed to store information local to the servers 2230.

It is appreciated that the systems and methods described herein can be utilized with a variety of suitable components (e.g., software and/or hardware) and devices and still be in accordance with the present invention. Suitable components and devices include MP3 players, DVD players, portable DVD players, CD players, portable CD players, video compact disk (VCD) players, super video compact disk (SVCD) players, electronic book devices, personal digital assistants (PDA), computers, car stereos, portable telephones and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An audio system comprising:
a tuner that selectively receives audio content;
a controller that selectively records the audio content based at least in part upon characteristics of the audio content;

a user interface that permits selection of a user preference from desirable and undesirable candidate seed items, the candidate seed items comprise a subset of the recorded audio content, each seed item representative of a set of similar content, the user interface includes a user scan input with multiple selections: a first user scan input selection initiates a scan of candidate seed items; and a second user scan input selection designates a desirable candidate seed item and stops the initiated scan upon designation of the desirable candidate seed item, an item not designated is identified as an undesirable candidate seed item; and a playback component that selectively plays the audio content or the user preference of the recorded audio content.

2. The audio system of claim 1, the recorded audio content being compressed.

3. The audio system of claim 1, the recorded audio content comprising a report of a type of information selected from the group comprising news, traffic, weather and sports.

4. The audio system of claim 1, further comprising a computer readable medium that stores media.

5. The audio system of claim 4, the computer readable medium being portable.

6. The audio system of claim 1, wherein the playback component accepts the user preferences for selecting the subset of content, the user preferences comprising at least a playlist of the recorded audio content compared to a preference function generated from the desirable candidate seed items and undesirable candidate seed items.

7. The audio system of claim 1, the user interface further comprising at least one of: a user selectable news input, a user selectable weather input, or a user selectable traffic input, wherein the user selectable inputs comprise a user selectable button or a user selectable touch sensitive screen.

8. The audio system of claim 1, further comprising at least one high-speed interface and at least one external media source, the high-speed interface being operative to transfer content from the external media source to the controller.

9. The audio system of claim 8, the high-speed interface being at least one of a universal serial bus, a firewire based interface, or a wireless network.

10. The audio system of claim 1, further comprising a component to automatically search at least one channel to identify a starting signature associated with a media item and automatically record the media item on identifying the starting signature.

11. The audio system of claim 10, the starting signature comprising a previously known jingle.

12. The audio system of claim 10, further comprising continuing to search the at least one channel while recording and identifying an ending signature.

13. The audio system of claim 10, further comprising a component to train the system to recognize the signature.

14. The audio system of claim 1, implemented as part of at least one of a personal digital assistant, a car radio, or a portable audio device.

15. A method that controls the delivery of audio, the method comprising:

receiving at least one audio broadcast over a tuner;

providing selective audio content from the audio broadcast to the controller, the selective audio content may be at least one of entertainment, news, weather, and sports;

recording the selective audio content based on at least one of characteristics for the audio content and metadata for the audio content, the recorded selective audio content accessible for short and long term;

storing the recorded selective audio content;

playing a subset of the recorded selective audio content to a user;

permitting the user to select from the subset of the recorded selective audio content for full playback, the subset of the selective audio content is a list of candidate seed items, the user selected audio content marked as a desirable seed item and non-selected audio content marked as an undesirable seed item, a first of the candidate seed item played is randomly chosen from the subset of recorded selective audio content and subsequent candidate seed items are iteratively chosen to be dissimilar from the prior candidate seed items;

generating a preference function from the desirable seed items and the undesirable seed items;

comparing the recorded selective audio content not previously played against the preference function to generate a playlist of selective audio content similar to the desirable seed items and dissimilar to the undesirable seed items; and playing at least one of the audio broadcast received over the tuner or the selective audio content of the playlist.

16. The method of claim 15, wherein the characteristics for the audio content may be a signature or a jingle.

17. The method of claim 15, wherein recording at least a subset of the selective audio content is based on a schedule.

18. The method of claim 15, wherein the stored selective audio content is replaced when a new recording of a same type of stored selective audio is recorded.

19. The method of claim 15, farther comprising receiving a plurality of audio broadcasts over a tuner.

20. A system for audio delivery, the system comprising:

means for receiving at least one of digital and analog audio broadcast;

means for recording the at least one of digital and analog audio broadcast based on the characteristics contained in the audio broadcast;

means for storing the recorded audio broadcast;

means for playing a seed item of a recorded audio broadcast, the seed item of a recorded audio broadcast includes a segment of audio broadcast from a sub-collection of the recorded audio broadcast;

means for a user to select a seed item being played, selected seed items are desirable seed items and seed items not selected are undesirable seed items;

means for generating a playlist from the desirable and undesirable seed items based on the characteristics of the seed items, the playlist contains references or pointers to recorded audio broadcast content similar to the desirable seed items and audio broadcast content dissimilar from the undesirable seed items;

means for playing the at least one of digital and analog audio broadcast content and the audio broadcast content of the playlist.

* * * * *